US010901804B2

(12) United States Patent
Choudhary et al.

(10) Patent No.: US 10,901,804 B2
(45) Date of Patent: Jan. 26, 2021

(54) APPARATUS AND METHOD TO SELECT SERVICES FOR EXECUTING A USER PROGRAM BASED ON A CODE PATTERN INCLUDED THEREIN

(71) Applicant: FUJITSU LIMITED, Kawasaki (JP)

(72) Inventors: Shridhar Choudhary, Kawasaki (JP); Atsuji Sekiguchi, Kawasaki (JP); Kosaku Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 16/209,163

(22) Filed: Dec. 4, 2018

(65) Prior Publication Data

US 2019/0188049 A1    Jun. 20, 2019

(30) Foreign Application Priority Data

Dec. 15, 2017  (JP) .................................. 2017-240235
Jul. 20, 2018  (JP) .................................. 2018-136583

(51) Int. Cl.
  *G06F 9/50*   (2006.01)
  *G06F 9/445*  (2018.01)
  *G06F 8/41*   (2018.01)
  *G06F 8/61*   (2018.01)

(52) U.S. Cl.
  CPC ............ *G06F 9/5077* (2013.01); *G06F 8/425* (2013.01); *G06F 8/61* (2013.01); *G06F 9/445* (2013.01); *G06F 9/5016* (2013.01); *G06F 9/5027* (2013.01)

(58) Field of Classification Search
  CPC ...... G06F 9/5077; G06F 9/445; G06F 9/5016; G06F 9/5027; G06F 8/425; G06F 8/61
  See application file for complete search history.

(56) References Cited

U.S. PATENT DOCUMENTS

| 9,208,184 B1* | 12/2015 | Ukeda ..................... G06F 30/00 |
| 10,474,499 B2* | 11/2019 | Juretic .................. G06F 9/5061 |
| 2012/0110570 A1 | 5/2012 | Jacobson et al. |
| 2013/0091285 A1 | 4/2013 | Devarakonda et al. |
| 2014/0223415 A1 | 8/2014 | van Gogh et al. |

FOREIGN PATENT DOCUMENTS

| JP | 2011-082722 | 4/2011 |
| JP | 2013-541113 | 11/2013 |
| JP | 2014-532247 | 12/2014 |
| JP | 2015-515037 | 5/2015 |
| JP | 2015-530647 | 10/2015 |
| JP | 2016-509737 | 3/2016 |
| JP | 2016-110325 | 6/2016 |
| WO | 2012/057955 | 5/2012 |
| WO | 2013/055601 | 4/2013 |
| WO | 2013/120686 | 8/2013 |
| WO | 2014/025584 | 2/2014 |
| WO | 2017/022825 | 2/2017 |

\* cited by examiner

*Primary Examiner* — Jacob D Dascomb
(74) *Attorney, Agent, or Firm* — Fujitsu Patent Center

(57) ABSTRACT

An apparatus selects services to be used by a user from a plurality of candidates for services used to execute a program. The apparatus acquires a constraint condition and the program. When executing the acquired program, the apparatus specifies a set of services satisfying the constraint condition from the plurality of candidates based on a code pattern included in the program, and uses the specified set of services to execute the program.

15 Claims, 36 Drawing Sheets

FIG. 5

ENVIRONMENT SETTING STORAGE UNIT — 121

ENVIRONMENT SETTING MANAGEMENT TABLE — 141

| CLOUD SYSTEM NAME | AUTHENTICATION INFORMATION |
|---|---|
| A SYSTEM | accessKeyId: 'xxx'<br>secretAccessKey: 'yyy'<br>region: 'us-west-2'<br>accountId: '123' |
| B SYSTEM | uri: 'https://otherservices.com'<br>username: 'user'<br>password: 'pass' |

FIG. 6

PROGRAM STORAGE UNIT — 122

PROGRAM — 142

```
'use strict';
const express = require('express');
const bodyParser = require('body-parser');
const Email = require('email').Email;
const app = express();

var csv = { };

app.use(bodyParser.urlencoded({ extended: true }));
app.use(bodyParser.json());

app.post('/csv', function(req, res) {
  const name = req.body.name;
  const object = req.body.object;
  csv[name] = object;
  for (const record of csv[name].split(/¥r¥n|¥r|¥n/)) {
    const fields = record.split(',');
    new Email({
      from: 'foo@bar.com', to: 'baz@qux.com',
      subject: 'hello', body: 'hello, world'
    }).send();
  }
  res.end(JSON.stringify({'name': name, 'object': object}));
});

const port = process.env.PORT | 3000;
app.listen(port, function() {
  console.log(`app listening on port ${port}`);
});
```

CONSTRAINT CONDITION — 143

Cost: 100 YEN

FIG. 8A

CONVERSION RULE STORAGE UNIT ~123

CONVERSION RULE TABLE ~145

| RULE ID | RULE NAME | CODE PATTERN | USABLE SERVICE |
|---|---|---|---|
| R1 | RunOnServer | ROOT NODE | - |
| R2 | DeclareContainer A1 | FREE VARIABLE DECLARATION | CONTAINER SERVICE A1 |
| R3 | DeclareContainer A2 | FREE VARIABLE DECLARATION | CONTAINER SERVICE A2 |
| R4 | PutInContainer | ASSIGNMENT STATEMENT FOR VARIABLE | - |
| R5 | DeclareFunction BehindContainer AF1 | STATEMENT FOR USING VARIABLE AFTER ASSIGNMENT | SERVICE AF1 OF SERVERLESS FUNCTION |
| R6 | DeclareFunction BehindContainer AF2 | STATEMENT FOR USING VARIABLE AFTER ASSIGNMENT | SERVICE AF2 OF SERVERLESS FUNCTION |
| R7 | ParallelizeForOf F1FA1 | for-of BLOCK | SERVICE F1 OF SERVERLESS FUNCTION AND CONTAINER SERVICE FA1 |
| R8 | ParallelizeForOf F2FA2 | for-of BLOCK | SERVICE F2 OF SERVERLESS FUNCTION AND CONTAINER SERVICE FA2 |

FIG. 8B

CONVERSION RULE STORAGE UNIT — 123

CONVERSION RULE TABLE — 145

| RULE ID | APPLICATION CONDITION | TEMPLATE | COST |
|---|---|---|---|
| R1 | - | (EXECUTE ENTIRE CODE IN SERVER FUNCTION) | - |
| R2 | - | (CREATE CONTAINER) | C1 |
| R3 | - | (CREATE CONTAINER) | C2 |
| R4 | DeclareContainer RULE IS ALREADY APPLIED TO VARIABLE | (PUT INTO CONTAINER) | - |
| R5 | PutInContainer RULE IS ALREADY APPLIED TO VARIABLE | (CREATE FaaS FUNCTION) | C3 |
| R6 | PutInContainer RULE IS ALREADY APPLIED TO VARIABLE | (CREATE FaaS FUNCTION) | C4 |
| R7 | - | (CREATE CONTAINER AND CREATE FaaS FUNCTION) | C5+C6 |
| R8 | - | (CREATE CONTAINER AND CREATE FaaS FUNCTION) | C7+C8 |

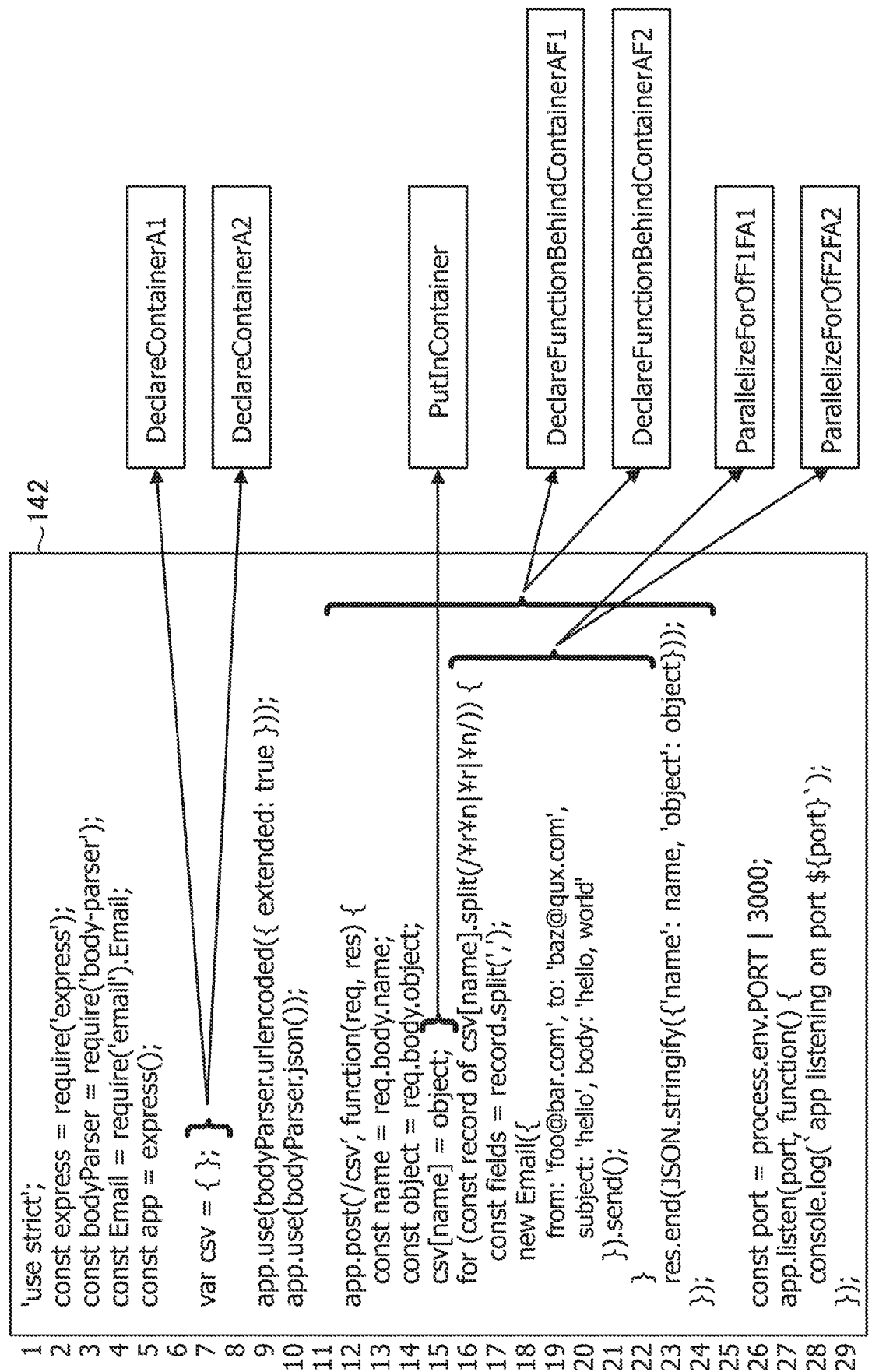

FIG. 11

143 — CONVERSION RULE STORAGE UNIT

TEMPLATE 145a

```
const asys = require('Asystem-sdk');
const s3 = new Asystem.S3({
   accessKeyId: '%= settings.asys.accessKeyId %',
   secretAccessKey: '%= settings.asys.secretAccessKey %',
   region: '%= settings.asys.region %'
});
new Promise((resolve, reject) => {
   s3.putObject({
      Bucket: '%= left.object.name %',
      Key: '%= left.property.name %',
      Body: <%= right %>
   }, (err, result) => {
      if (err) {
         console.log(err);
      }
      resolve(result);
   });
}).then(<%= arg %> =>
   {%= then %}
);
```

FIG. 12

PROGRAM STORAGE UNIT — 132

PROGRAM (AFTER CONVERSION) — 146

```
...
const name = req.body.name;
const object = req.body.object;
const asys = require('Asystem-sdk');
const s3 = new asys.S3({
   accessKeyId: 'xxx',
   secretAccessKey: 'yyy',
   region: 'us-west-2'
});
new Promise((resolve, reject) => {
   s3.putObject({
      Bucket: 'csv',
      Key: 'name',
      Body: object
   }, (err, result) => {
      if (err) {
         console.log(err);
      }
      resolve(result);
   });
}).then(container => {
   for (const record of csv[name].split(/¥r¥n|¥r|¥n/)) {
...
```

FIG. 18

| ITEM | CREATABLE SERVICE INSTANCE | COST |
|---|---|---|
| OBJECT STORAGE | A1 | C1 = 10 |
| | A2 | C2 = 20 |
| | FA1 | C6 = 10 |
| | FA2 | C8 = 30 |
| FaaS | F1 | C5 = 20 |
| | F2 | C7 = 50 |
| | AF1 | C3 = 30 |
| | AF2 | C4 = 50 |

FIG. 19A

VALUES OF VARIABLES $A1, A2, FA1, FA2, F1, F2, AF1, AF2 = $ True or False
True : THE SERVICE IS TO BE USED
False : THE SERVICE IS NOT TO BE USED

FIG. 19B

CONDITIONS $A1$ xor $A2 = $ True
$AF1$ xor $AF2 = $ True
$FA1$ xor $FA2 = $ True
$F1$ xor $F2 = $ True

FIG. 19C

COST FUNCTION $A1*C1+A2*C2+FA1*C6+FA2*C8+F1*C5+F2*C7+AF1*C3+AF2*C4<=C$

FIG. 20A

PATTERN a

OBJECT STORAGE = A2
SERVICE OF SERVERLESS FUNCTION EXECUTING THE STATEMENT = AF1
SERVICE OF SERVERLESS FUNCTION AND CONTAINER SERVICE
EXECUTING THE STATEMENT = F2 AND FA2
COST FUNCTION:
$C2+C3+C7+C8 = 130 >$ C (= 100)

REJECTED

FIG. 20B

PATTERN b

OBJECT STORAGE = A1
SERVICE OF SERVERLESS FUNCTION EXECUTING THE STATEMENT = AF1
SERVICE OF SERVERLESS FUNCTION AND CONTAINER SERVICE
EXECUTING THE STATEMENT = F1 AND FA1
COST FUNCTION:
$C1+C3+C5+C6 = 70 <$ C (= 100)

ADOPTED

FIG. 20C

PATTERN c

OBJECT STORAGE = A2
SERVICE OF SERVERLESS FUNCTION EXECUTING THE STATEMENT = AF2
SERVICE OF SERVERLESS FUNCTION AND CONTAINER SERVICE
EXECUTING THE STATEMENT = F1 AND FA1
COST FUNCTION:
$C2+C4+C5+C6 = 100 =$ C (= 100)

REJECTED

FIG. 27

PROGRAM STORAGE UNIT — 122

PROGRAM — 142

```
'use strict';
const express = require('express');
const bodyParser = require('body-parser');
const Email = require('email').Email;
const app = express();

var csv = { };

app.use(bodyParser.urlencoded({ extended: true }));
app.use(bodyParser.json());

app.post('/csv', function(req, res) {
  const name = req.body.name;
  const object = req.body.object;
  csv[name] = object;
  for (const record of csv[name].split(/¥r¥n|¥r|¥n/)) {
    const fields = record.split(',');
    new Email({
      from: 'foo@bar.com', to: 'baz@qux.com',
      subject: 'hello', body: 'hello, world'
    }).send();
  }
  res.end(JSON.stringify({'name': name, 'object': object}));
});

const port = process.env.PORT | 3000;
app.listen(port, function() {
  console.log(`app listening on port ${port}`);
});
```

CONSTRAINT CONDITION — 143a

Availability: 99 %

FIG. 32A
CONDITIONS
A1 xor A2 = True
AF1 xor AF2 = True
FA1 xor FA2 = True
F1 xor F2 = True
FIG. 32B
EXAMPLE OF COST FUNCTION (PART 1)
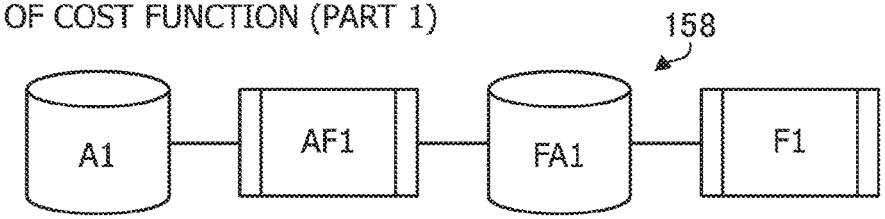
COST FUNCTION
(a1 or a2)*(fa1 or fa2)*(f1 or f2)*(af1 or af2)>=A
FIG. 32C
EXAMPLE OF COST FUNCTION (PART 2)
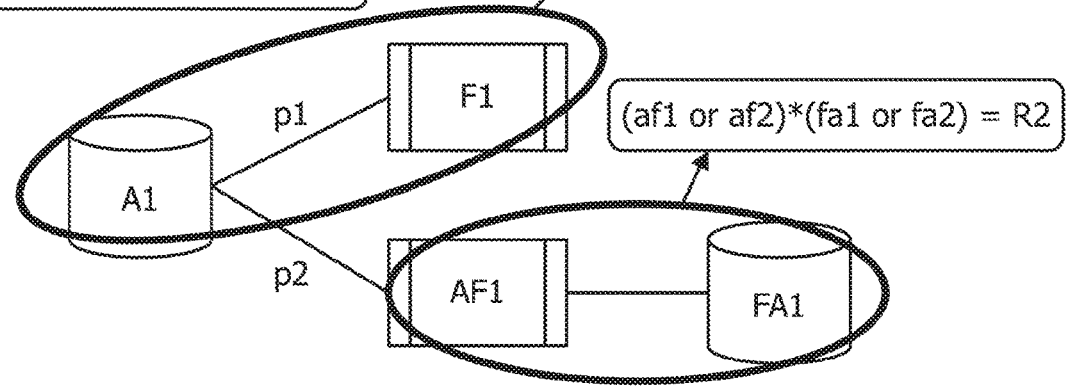
p1,p2 : CALL PROBABILITY
p1+p2=1
(a1 or a2)*(f1 or f2) = R1
(af1 or af2)*(fa1 or fa2) = R2
COST FUNCTION
R1*p1 + (R2*(a1 or a2))*p2 >= A

APPARATUS AND METHOD TO SELECT SERVICES FOR EXECUTING A USER PROGRAM BASED ON A CODE PATTERN INCLUDED THEREIN

CROSS-REFERENCE TO RELATED APPLICATION

This application is based upon and claims the benefit of priority of the prior Japanese Patent Application Nos. 2018-136583, filed on Jul. 20, 2018, and 2017-240235, filed on Dec. 15, 2017, the entire contents of which are incorporated herein by reference.

FIELD

The embodiments discussed herein are related to apparatus and method to select services for executing a user program based on a code pattern included therein.

BACKGROUND

In recent years, an information processing environment of a service provider is often used through a network, instead of possessing an information processing environment for executing application software. A service for using the information processing environment through the network is called a cloud service in some cases. The information processing environment usable as a cloud service may include calculation hardware, such as a processor and a memory, a local network, infrastructure software, such as an operating system (OS) and a database, a security mechanism, and the like.

There are various types of cloud services. For example, there is a service in which the user borrows unit calculation resources, such as physical machines and virtual machines, and an application program created by the user is executed on the unit calculation resources. There are also a service for installing a lightweight program created by the user to execute the lightweight program only for a short time when a specific event occurs and a service for saving data received from a network.

In the cloud service, a program, setting information, and the like are received in advance from the user, and a process desired by the user is set to allow executing the process in the information processing environment on the cloud service side. The cloud service executes the set process according to a processing request. The cloud service provides an application programming interface (API), and the API may be used from a program outside the cloud service to request for a process. This allows to develop distributed processing software in which a cloud service and an external program (for example, a program of another cloud service) cooperate.

Note that a function arrangement designing apparatus is proposed that measures a performance of instances as installation candidates obtained from the cloud and a performance between instances and that decides instances at the installation location satisfying customer requirements based on measurement results of the performances.

A system is also proposed that compares performance characteristics of clusters of a plurality of nodes during execution of a workload in a cloud computing system and desirable performance characteristics of the clusters and that selects a set of configuration parameters of the clusters based on the comparison.

A system is also proposed that forms a feature vector of each of a plurality of component arrangement requests and that forms clusters of a plurality of feature vectors to thereby form clusters of the component arrangement requests to decide arrangement positions of components for each cluster.

A method is also proposed in which an infrastructure including existing substructures capable of replicating individual parts through an existing replication mechanism is identified, and the existing substructures of the infrastructure are moved to the cloud.

A system is further proposed that acquires all read and write calls to and from an area capable of storing state information in order to operate an existing stateful application in a stateless process. The proposed system includes a virtualization layer for redirecting the calls to independent state information that may be stored in a cloud storage system.

Examples of related-are documents are International Publication Pamphlet No. WO 2017/022825, International Publication Pamphlet No. WO 2014/025584, International Publication Pamphlet No. WO 2013/120686, International Publication Pamphlet No. WO 2013/055601, and International Publication Pamphlet No. WO 2012/057955.

SUMMARY

According to an aspect of the invention, an apparatus selects services to be used by a user from a plurality of candidates for services used to execute a program. The apparatus acquires a constraint condition and the program. When executing the acquired program, the apparatus specifies a set of services satisfying the constraint condition from the plurality of candidates based on a code pattern included in the program, and uses the specified set of services to execute the program.

The object and advantages of the invention will be realized and attained by mean of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 depicts an example of an environment setting management table;

FIG. 6 depicts an example of a program before conversion and a constraint condition;

FIGS. 8A and 8B depict an example of a conversion rule table;

FIG. 10 depicts an example of a relation between the program before conversion and the conversion rules;

FIG. 11 depicts an example of a template included in the conversion rule table;

FIG. 12 depicts an example of a program after conversion;

FIG. 18 depicts an example of cost;

FIGS. 19A to 19C depict an example of a cost function;

FIGS. 20A to 20C depict an example of determination based on the cost function;

FIG. 27 depicts an example of the program before conversion and a constraint condition;

FIGS. 32A to 32C depict an example of a cost function according to the service configuration model.

DESCRIPTION OF EMBODIMENTS

There may be a plurality of candidates for cloud services that provide a function described in the program created by the user. Services for saving data include various services, such as a service for providing relational database (RDB) and a service for providing an object storage like key-value store (KVS). Therefore, the user may select a service to be used for the execution of the program from a plurality of candidates regarding the function. However, it is not easy for the user to select in advance the service for each function according to the policy of the user regarding the use of the cloud environment to thereby create a program to use the selected service.

It is preferable to appropriately specify a service to be used.

Hereinafter, embodiments will be described with reference to the drawings.

First Embodiment

Figure 1:
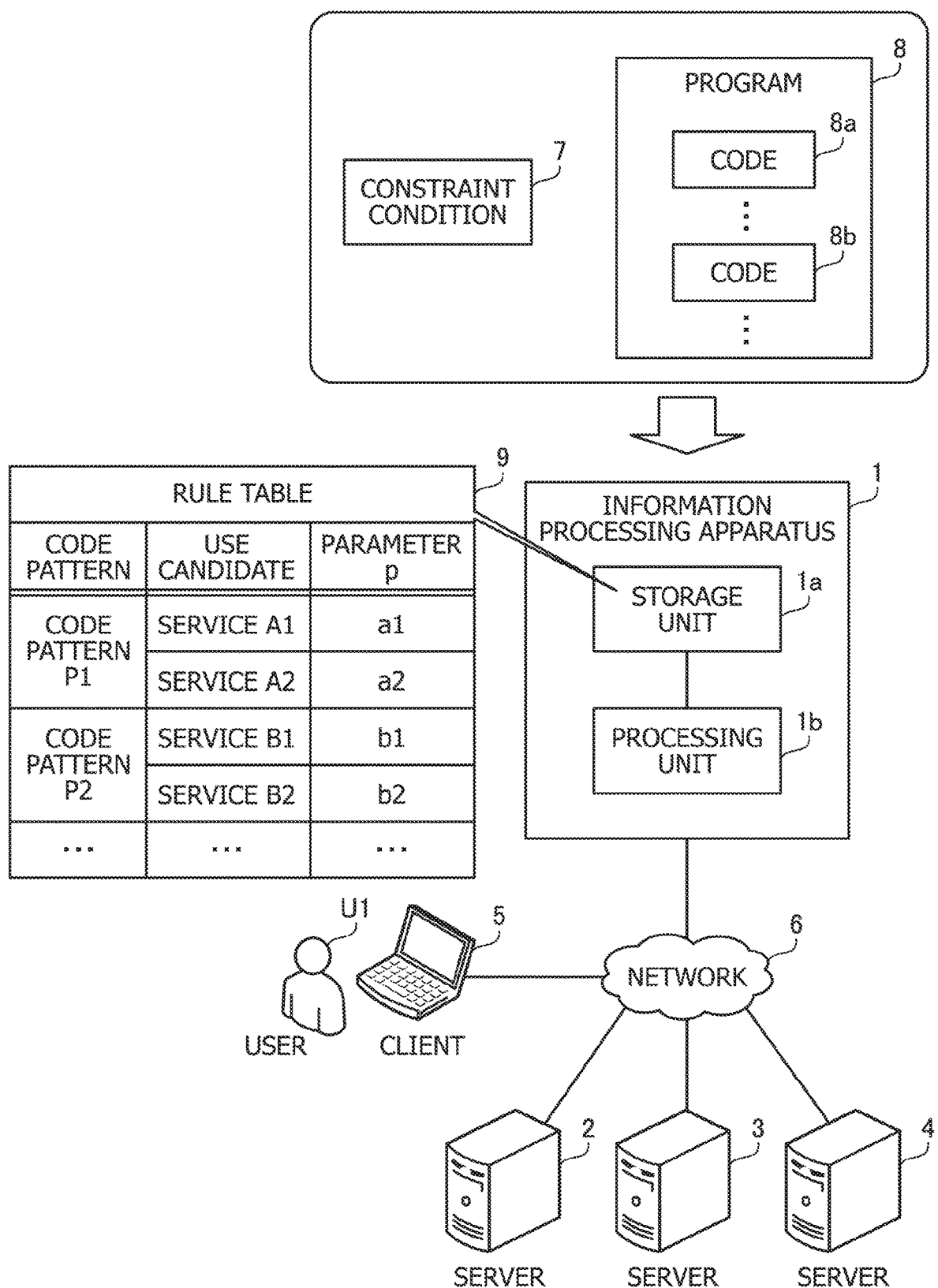
FIG. 1 depicts an information processing apparatus of a first embodiment.

FIG. 1 depicts an information processing apparatus of a first embodiment. An information processing apparatus 1 is coupled to servers 2, 3, and 4 and a client 5 through a network 6. The information processing apparatus 1 supports development of a program by a user U1. The servers 2, 3, and 4 are computers (may also be referred to as information processing apparatuses) that provide various services. Various services provided by the servers 2, 3, and 4 are used to execute the program. The user U1 operates the client 5 to input information such as a program to the information processing apparatus 1. The information processing apparatus 1 selects a service to be used by the user U1 from a plurality of candidates for services used to execute the program.

The information processing apparatus 1 includes a storage unit 1a and a processing unit 1b. The storage unit 1a may be a volatile semiconductor memory, such as a random access memory (RAM), or may be a non-volatile storage, such as a hard disk drive (HDD) and a flash memory. The processing unit 1b is a processor, such as a central processing unit (CPU) and a digital signal processor (DSP). However, the processing unit 1b may include an electronic circuit for specific application, such as an application specific integrated circuit (ASIC) and a field programmable gate array (FPGA). The processor executes a program stored in a memory such as a RAM (may be the storage unit 1a). A set of a plurality of processors may also be referred to as a "multiprocessor" or simply as a "processor."

The storage unit 1a stores a constraint condition 7 and a program 8 acquired by the processing unit 1b. The constraint condition 7 is information indicating a constraint according to a policy (such as a use policy of service) of the user U1 involving the execution of the program 8. The program 8 is created by the user. The program 8 may be created without taking into account the setting of the servers 2, 3, and 4 or the processing request between the servers through the network 6.

Examples of the constraint indicated by the constraint condition 7 include an upper limit of the cost associated with the use of service and a lower limit of the performance. Examples of the cost include an expense for using the service and an amount of computation resources (amount of processor resources or amount of memory resources) desirable for the processing of service. Examples of the performance include response time of service (or index value indicating the speed of response time) and an availability rate (or index indicating the reliability of service such as frequency of release of update patches for the service).

The storage unit 1a also stores in advance a rule table 9. The rule table 9 is information indicating a correspondence between (a) patterns of codes (code patterns) indicating processes that allow to use specific services among the codes (set of commands) that may appear in the program 8 and (b) candidates for usable services (use candidates). The rule table 9 may also be referred to as rule information. Values of a given parameter p corresponding to the services are also set in the rule table 9. The parameter p is an index indicating the cost, the performance, or the like when the service is selected. The parameter p is an input for the constraint condition 7.

For example, the rule table 9 includes a code including a code pattern P1, a service A1 as a use candidate, and a parameter p=a1. The record indicates that the service A1 is usable for the code pattern P1 in the program, and the value of the parameter p when the service A1 is used is a1.

The rule table 9 also includes a record including the code pattern P1, a service A2 as a use candidate, and a parameter p=a2. The record indicates that the service A2 is usable for the code pattern P1 in the program, and the value of the parameter p when the service A2 is used is a2.

The services as use candidates and the values of the parameter p are similarly registered for the other code patterns in the rule table 9.

The servers 2, 3, and 4 are, for example, server computers that provide a cloud service. The servers 2, 3, and 4 use a preset program, setting information, and the like to execute a process according to a processing request received through the network 6. Examples of the process executable by the servers 2, 3, and 4 include processing a message received through the network 6, executing a function according to a request received through the network 6, and saving data received through the network 6.

The processing unit 1b acquires the constraint condition 7 and the program 8. The processing unit 1b stores the constraint condition 7 and the program 8 in the storage unit 1a. In executing the program 8, the processing unit 1b specifies a set of services satisfying the constraint condition 7 from the plurality of candidates for services based on the code patterns included in the program 8. The processing unit 1b uses the specified set of services to execute the program 8.

For example, the processing unit 1b uses pattern matching to detect a code 8a corresponding to the code pattern P1 from the program 8. In this case, it can be stated that the program 8 includes the code pattern P1. The processing unit 1b then specifies, based on the rule table 9, the services A1 and A2 that are services as use candidates corresponding to the code 8a.

The processing unit 1b also uses pattern matching to detect, from the program 8, a code 8b corresponding to a code pattern P2 registered in the rule table 9. In this case, it can be stated that the program 8 includes the code pattern P2. The processing unit 1b then specifies, based on the rule table 9, services B1 and B2 that are services as use candidates corresponding to the code 8b.

Note that one service is selected for one code corresponding to a code pattern. In the example, one of the services A1 and A2 is selected for the code 8a. In addition, one of the services B1 and B2 is selected for the code 8b.

In this way, the processing unit 1b detects each code pattern included in the program 8 and specifies a plurality of candidates for services. The processing unit 1b then acquires the parameter p for each candidate from the rule table 9 and specifies a set of services satisfying the constraint condition 7. In the example considered below, the candidates for services to be selected are the services A1, A2, B1, and B2, and an upper limit Z of the sum total of the costs is provided as the constraint condition 7. It is also assumed that the parameter p indicates the value of the cost of the candidate for service.

In this case, there are four selectable sets of services including a set of services A1 and B1, a set of services A1 and B2, a set of services A2 and B1, and a set of services A2 and B2. The sum total of the costs when the set of services A1 and B1 is selected is a1+b1. The sum total of the costs when the set of services A1 and B2 is selected is a1+b2. The sum total of the costs when the set of services A2 and B1 is selected is a2+b1. The sum total of the costs when the set of services A2 and B2 is selected is a2+b2.

Among these, it is assumed that the set not exceeding the upper limit Z is the services A1 and B1. In this case, the processing unit 1b specifies the set of services A1 and B1 as the set of services satisfying the constraint condition 7. Note than when there are a plurality of sets not exceeding the upper limit Z, the processing unit 1b may specify the set of services with the minimum sum total of the costs.

Once the processing unit 1b specifies the set of services A1 and B1 as the set of services satisfying the constraint condition 7, the processing unit 1 uses the set of services A1 and B2 to execute the program 8. For example, when the processing unit 1b executes the part of the code 8a of the program 8, the processing unit 1b may convert the code 8a into a code for using the service A1 and execute the code. Similarly, when the processing unit 1b executes the part of the code 8b of the program 8, the processing unit 1b may convert the code 8b into a code for using the service B1 and execute the code.

Alternatively, the processing unit 1b may convert the program 8 into a program group for distributed processing software provided with a combination of a plurality of services. For example, a first template for program conversion may be registered in advance in the rule table 9 in association with the code pattern P1. Similarly, a second template for program conversion may be registered in advance in the rule table 9 in association with the code pattern P2. The "template" indicates a format (model) of a given program defining the process of the service.

For example, the first template indicates a format (model) of a program defining that the server 2 executes a specific process according to a processing request. The first template is, for example, a format of a program to be executed by the server 2 or a format of a program for transmitting the setting information to the server 2. The second template indicates, for example, a format (model) of a program for transmitting a processing request to the server 2 through the network 6.

In another example, the first template indicates a format of a function program, and the second template indicates a format of a program for calling a function. In another example, the first template indicates a format of a program for setting the data saving location, and the second template indicates a format of a program for requesting writing or reading of data.

In this case, the processing unit 1b may assign the value extracted from the code 8a to the argument of the first template to generate a first program after conversion that uses the service A1. For example, the first program after conversion defines that the server 2 uses the service A1 to execute the process corresponding to the code 8a. The first program after conversion is applied to the server 2. For example, the first program after conversion is transmitted to the server 2, and the server 2 executes the first program after conversion. Given setting information may also be transmitted to the server 2 according to, for example, a procedure defined by the first program after conversion.

The processing unit 1b may further assign the value extracted from the code 8b to the argument of the second template to generate a second program after conversion that uses the service B1. For example, the second program after conversion defines that the server 3 uses the service B1 to execute the process corresponding to the code 8b. The second program after conversion is applied to, for example, the server 3 different from the server 2. For example, the second program after conversion is transmitted to the server 3, and the server 3 executes the second program after conversion.

Note that the server 3 may also provide other services. In that case, the second template also provides a format of a program defining that the server 3 executes a specific process. As a result, the processing unit 1b may also associate a plurality of services (for example, services A1 and B1) on the servers 2 and 3 to execute the process described in the program 8.

According to the information processing apparatus 1, the constraint condition 7 and the program 8 are acquired, and in executing the acquired program 8, a set of services satisfying the constraint condition 7 is specified from a plurality of candidates for services based on the code pattern included in the program 8. The program 8 is then executed based on the specified set of services.

As a result, the service to be used by the user U1 may be appropriately specified. An upper limit of the sum of the costs, such as expenses associated with the use of service, is used as the constraint condition 7. In this case, the information processing apparatus 1 may combine and provide the services to the user U1 such that the cost does not exceed the cost expected by the user U1.

A performance value associated with the use of service may also be used as the constraint condition 7. For example, an upper limit of the total response time may be used as the performance value. The upper limit of the total response time may be lowered (or a set of services with a shorter response time may be selected) to speed up the execution of the program 8.

A lower limit of the average availability rate may also be used as the constraint condition 7. The lower limit of the average availability rate may be raised (or a set of services with a larger average availability rate may be selected) to improve the reliability of the function realized by the program 8.

Alternatively, a lower limit of an index indicating the visibility of the code of the program after conversion (for example, the larger the value, the higher the visibility) may be used as the constraint condition 7. In that case, the parameter p represents an index indicating the visibility of the code when each service of the use candidate is used. For example, the lower limit of the sum of indices indicating the visibility of the code may be raised (or a set of services with a larger sum of indices may be selected) to improve the visibility of the program after conversion and to facilitate the maintenance of the program after conversion by the user U1.

The constraint condition 7 may also include conditions for a plurality of types of parameters, such as cost and performance value. The processing unit 1b may select a set of services satisfying all the conditions for the plurality of types of parameters. The processing unit 1b may also receive an input of priorities of various parameters. When there are a plurality of sets of services satisfying the constraint conditions 7, the processing unit 1b may select a set with superior evaluation for the condition of the type of parameter with a higher priority. For example, it is assumed that the constraint conditions 7 include conditions for the cost and the performance value, and the priority of the cost is higher than the priority of the performance value. In this case, when there are a plurality of sets of services satisfying all the conditions for the cost and the performance value, the processing unit 1b may specify that the set of services to be used is a set with the minimum cost among the plurality of sets.

Note that the main constituent that executes the processes of various services may be the information processing apparatus 1. For example, the information processing apparatus 1 may execute the processes of the services without requesting the servers 2, 3, and 4 to execute the processes of the services. Alternatively, the main constituent that executes the processes of various services may be an information processing system including the information processing apparatus 1 and the servers 2, 3, and 4 (other information processing apparatuses). In this case, it may also be stated that the main constituent that executes the function of the information processing apparatus 1, various services, and the program 8 (or program after conversion) is the information processing system.

Second Embodiment

Figure 2:
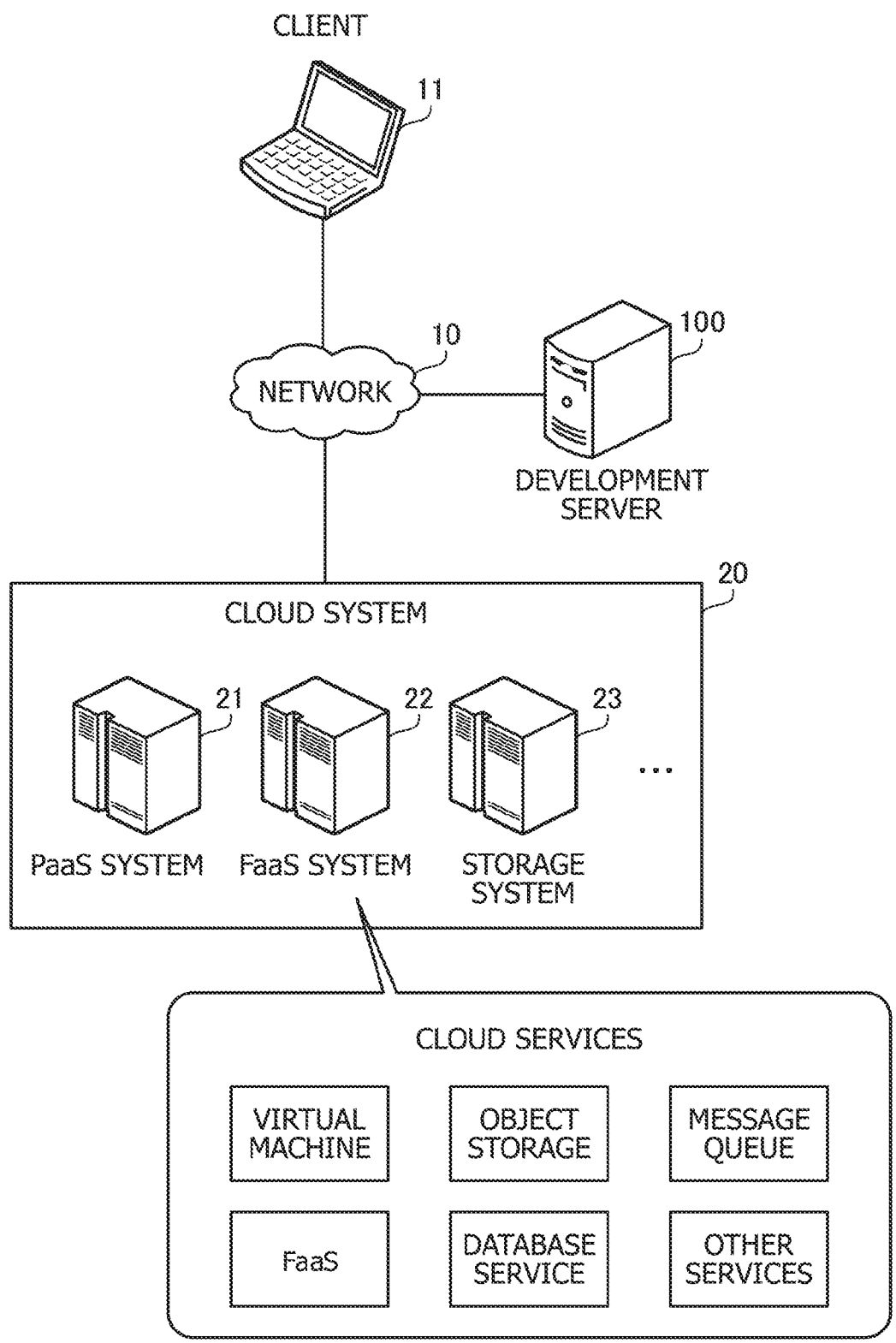
FIG. 2 depicts an example of an information processing system of a second embodiment.

FIG. 2 depicts an example of an information processing system of a second embodiment. The information processing system of the second embodiment combines a plurality of cloud services to assist development of application software to be implemented. The information processing system of the second embodiment includes a client 11, a cloud system 20, and a development server 100. The client 11, the cloud system 20, and the development server 100 are coupled to the network 10. The network 10 is a wide-area data communication network, such as the Internet. Note that the development server 100 is an example of the information processing apparatus 1 of the first embodiment.

The client 11 is a client computer used by a developer who develops application software. The client 11 accesses the development server 100 through the network 10 and interacts with the development server 100 to develop the application software. The client 11 also instructs the development server 100 to install the developed application software on the cloud system 20. For example, a web browser is installed on the client 11. In this case, the client 11 accesses the development server 100 through the web browser to allow the developer to edit the source code of the program on the web browser. The client 11 also instructs the installation of the application software through the web browser.

The development server 100 is a server computer that assists development of application software that may be installed on the cloud system 20. For example, the development server 100 assists development of distributed processing software associating a plurality of cloud services provided by the cloud system 20. The development server 100 receives an input by the developer from the client 11 through the network 10. The development server 100 creates a program according to the input and saves the program.

In this case, the developer may not directly describe, in the program, a process specific to the cloud services for associating the plurality of cloud services, and the developer may focus on defining a substantial information processing procedure (core logic). For example, the developer may create a program such that the entire core logic is closed and executed on one computer. The development server 100 converts the program created based on the input from the developer into a program group for distributed processing software provided with a combination of a plurality of cloud services.

The development server 100 receives an instruction of installation from the client 11. Consequently, the development server 100 uses the program group after the conversion to install, on the cloud system 20, service entities (may also be referred to as "service instances") started from the application software. A plurality of instances included in the service instances are distributed and installed on the plurality of server computers included in the cloud system 20.

The instances may include an instance started in advance on the server computer to wait for the occurrence of an event, such as reception of a request message. The instances may also include an instance started by the occurrence of an event and discarded after the completion of a process for the event. In the installation of the service instances, the development server 100 may transmit the program after conversion to the server computer to cause the server computer to execute the program after conversion or to set an executable state of the program. The development server 100 may also transmit setting information indicating the setting of the service instances to the server computer according to the program after conversion (for example, by executing the program after conversion). The method of transmitting the program after conversion and the setting information to the server computer of the cloud system 20 is in compliance with the terms of the used cloud service.

When the development server 100 receives an instruction for terminating the service instances from the client 11, the development server 100 uses the program group after the conversion to cause the cloud system 20 to terminate the service instances. When the development server 100 receives an instruction for removing the service instances from the client 11, the development server 100 uses the program group after the conversion to remove the data regarding the service instances from the cloud system 20. In this way, the development server 100 may execute the entire installation, termination, or removal altogether without the client 11 individually instructing the installation, the termination, or the removal of the plurality of cloud services. The cloud services may be simply referred to as "services" here.

The cloud system 20 is an information processing system possessed by one cloud provider and is installed in, for example, a data center. Although only one cloud system possessed by one cloud provider is coupled to the network 10 in FIG. 2, a plurality of cloud systems possessed by a plurality of cloud providers may be coupled to the network 10.

The cloud system 20 includes a plurality of subsystems including a platform as a service (PaaS) system 21, a function as a service (FaaS) system 22, and a storage system 23. Each of the subsystems, such as the PaaS System 21, the FaaS system 22, and the storage system 23, includes one or more server computers. The PaaS system 21 provides a PaaS service to the user. The FaaS system 22 provides a FaaS service to the user. The storage system 23 provides an object storage service to the user. In this way, the cloud system 20 provides a plurality of different types of cloud services. The cloud system 20 includes subsystems that further provide other types of cloud services, such as a database service and a message queue service.

The PaaS system 21 allows the user to use a platform as a basis of executing the application software. The platform includes hardware such as a CPU and a memory, an OS, and middleware. The platform to be used by the user may be a virtual machine. The user of the PaaS system 21 installs the application program on the platform and causes the PaaS system 21 to execute the application program.

The FaaS system 22 dynamically executes a "function" according to the occurrence of an event, such as reception of a request message and update of data. The function of FaaS is a relatively small-scale unit of processing and is implemented by a relatively small program. The user of the FaaS system 22 uploads in advance the program of the function to the FaaS system 22. When the FaaS system 22 detects an event, the FaaS system 22 loads the program of the function corresponding to the detected event to the memory and executes the function. The program of the function may be removed from the memory when the function is finished. In this way, the function is not started in advance and held. The function is automatically started according to the occurrence of an event and executed for a short time. A webhook may be used, and the update of data on the storage system 23 may be an event that triggers the start of the function.

The storage system 23 is a lightweight non-volatile storage system that saves object data in a key-value format. The user of the storage system 23 registers in advance a data saving location called "container" in the storage system 23. The container corresponds to, for example, a directory. The storage system 23 provides a PUT API for writing the object data to the container through the network and a GET API for reading the object data from the container through the network. The storage system 23 writes the object data to the container according to a call from the PUT API and reads the object data from the container according to a call from the GET API.

Note that in the cooperation of the function of the FaaS system 22 and the container of the storage system 23, the FaaS system 22 may monitor the update of the storage system 23, or the storage system 23 may notify the FaaS system 22 of the update of data.

Hereinafter, an example of developing application software provided with a combination of a plurality of cloud services including the PaaS service, the FaaS service, and the object storage service will be described. For example, there may be a plurality of cloud services usable for realizing a function. Therefore, the development server 100 provides a function of assisting selection of an appropriate combination of cloud services from candidates for selectable cloud services.

Figure 3:
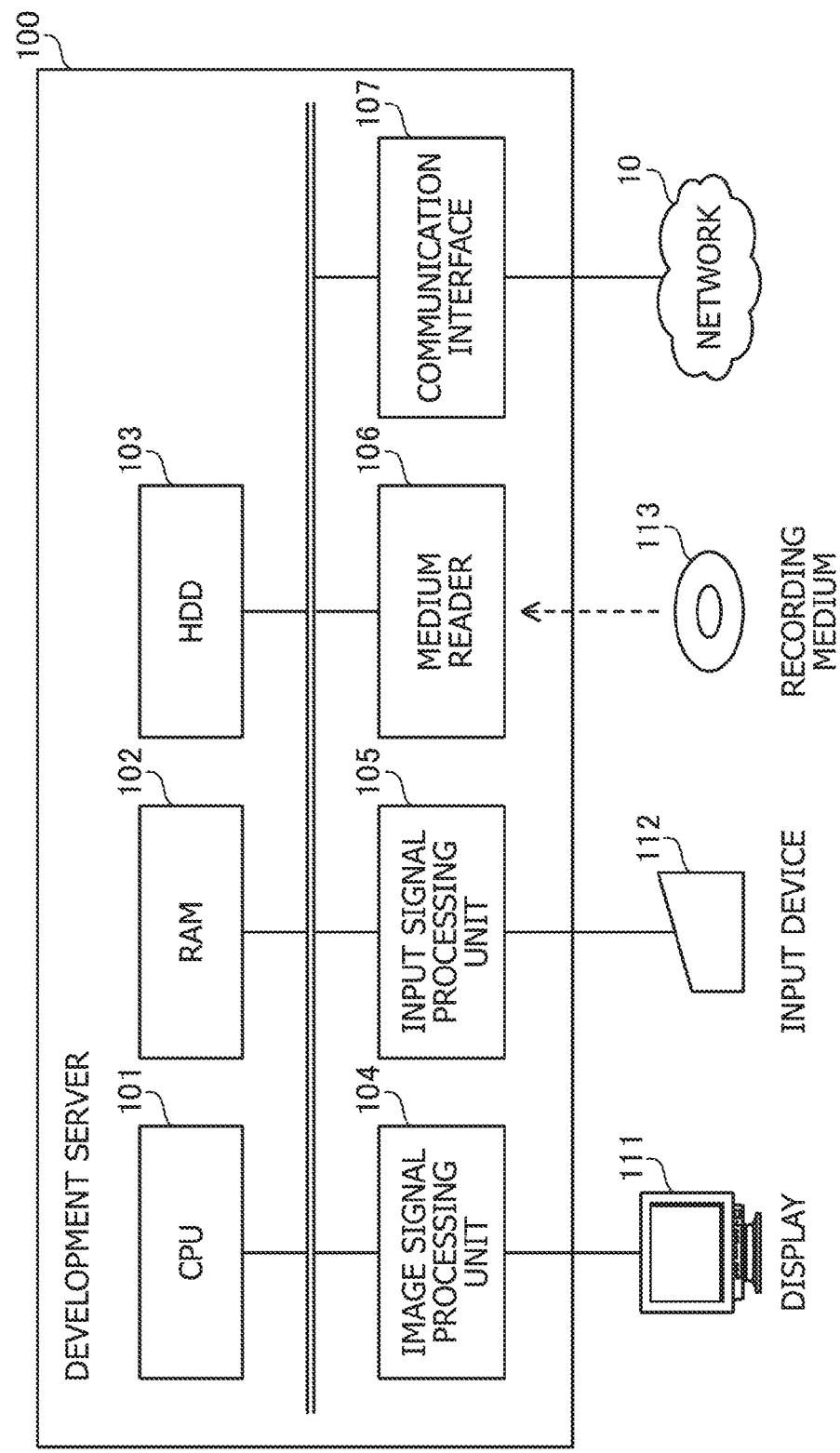
FIG. 3 is a block diagram illustrating an example of hardware of a development server.

FIG. 3 is a block diagram illustrating an example of hardware of the development server. The development server 100 includes a CPU 101, a RAM 102, an HDD 103, an image signal processing unit 104, an input signal processing unit 105, a medium reader 106, and a communication interface 107. The client 11 may also be implemented by using hardware as in the development server 100. The server computers used in the PaaS system 21, the FaaS system 22, and the storage system 23 may also be implemented by using hardware as in the development server 100. Note that the CPU 101 is an example of the processing unit 1*b* of the first embodiment. The RAM 102 or the HDD 103 is an example of the storage unit 1*a* of the first embodiment.

The CPU 101 is a processor that executes a command of a program. The CPU 101 loads at least part of the program or data stored in the HDD 103 to the RAM 102 and executes the program. Note that the CPU 101 may include a plurality of processor cores. The development server 100 may also include a plurality of processors and may use a plurality of processors or processor cores to execute in parallel the processes described below. The set of a plurality of processors may be referred to as a "multiprocessor" or simply as a "processor."

The RAM 102 is a volatile semiconductor memory that temporarily stores the program executed by the CPU 101 and the data used by the CPU 101 in computation. Note that the development server 100 may include a memory of a type other than the RAM or may include a plurality of memories.

The HDD 103 is a non-volatile storage apparatus that stores programs and data of software, such as an OS, middleware, and application software. Note that the development server 100 may include another type of storage apparatus, such as a flash memory and an solid state drive (SSD) or may include a plurality of non-volatile storage apparatuses.

The image signal processing unit 104 outputs an image to a display 111 coupled to the development server 100 according to a command from the CPU 101. An arbitrary type of display may be used for the display 111, such as a cathode ray tube (CRT) display, a liquid crystal display (LCD), a plasma display, and an organic electro-luminescence (OEL) display.

The input signal processing unit 105 acquires an input signal from an input device 112 coupled to the development server 100 and outputs the input signal to the CPU 101. A pointing device, such as a mouse, a touch panel, a touch pad, and a trackball, a keyboard, a remote controller, a button switch, and the like may be used for the input device 112. A plurality of types of input devices may be coupled to the development server 100.

The medium reader 106 is a reading apparatus that reads a program or data recorded in a recording medium 113. Examples of the recording medium 113 used include a magnetic disk, an optical disk, a magneto-optical disk (MO), and a semiconductor memory. Examples of the magnetic disk include a flexible disk (FD) and an HDD. Examples of the optical disk include a compact disc (CD) and a digital versatile disc (DVD).

The medium reader 106 copies the program or the data read from the recording medium 113 to another recording medium, such as the RAM 102 and the HDD 103. The read program is executed by, for example, the CPU 101. Note that the recording medium 113 may be a portable recording medium and may be used to distribute the program or the data. The recording medium 113 and the HDD 103 will be referred to as computer-readable recording media in some cases.

The communication interface 107 is an interface coupled to the network 10 to communicate with the client 11, the PaaS system 21, the FaaS system 22, the storage system 23, and the like through the network 10. The communication interface 107 is coupled to a communication apparatus, such as a switch and a router, through a cable.

Figure 4:
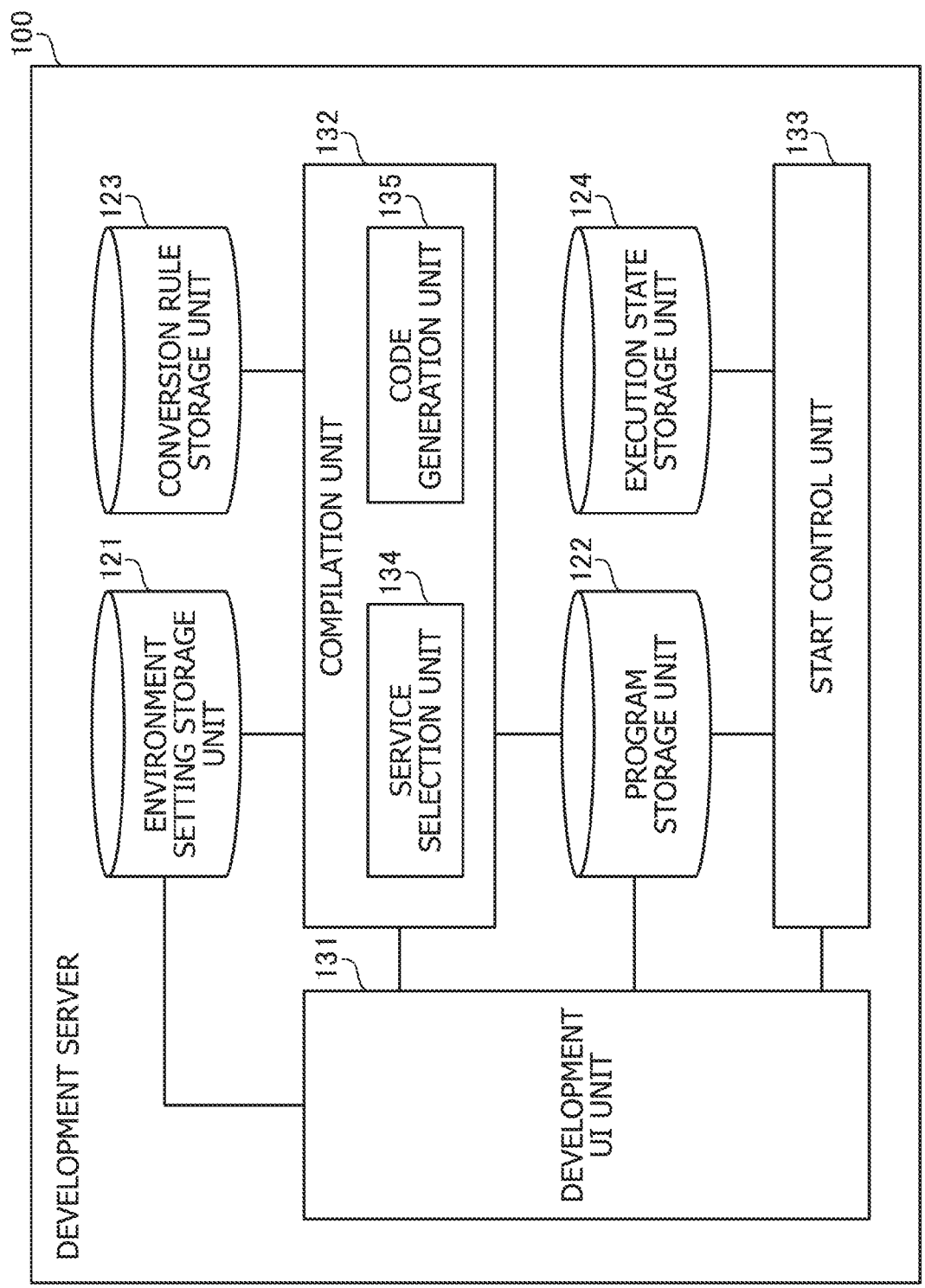
FIG. 4 is a block diagram illustrating an example of functions of the development server.

FIG. 4 is a block diagram illustrating an example of functions of the development server. The development server 100 includes an environment setting storage unit 121, a program storage unit 122, a conversion rule storage unit 123, an execution state storage unit 124, a development user interface (UI) unit 131, a compilation unit 132, and a start control unit 133. The environment setting storage unit 121, the program storage unit 122, the conversion rule storage unit 123, and the execution state storage unit 124 is implemented by using, for example, a storage area reserved in the RAM 102 or the HDD 103. The development UI unit 131, the compilation unit 132, and the start control unit 133 are implemented by using, for example, a program.

The environment setting storage unit 21 stores environment setting information indicating the setting for using the cloud system 20. Usually, a developer (user) needs to have a right to use the cloud system 20 based on a contract or the like in order to install application software created by the developer on the cloud system 20. Therefore, the environment setting storage unit 121 stores the environment setting information input from the developer. The environment setting information includes authentication information for authenticating the user of the cloud system 20. The authentication information includes, for example, various types of information called user identification (ID), password, access key, access token, credentials, and the like.

A plurality of cloud services provided by the same cloud provider, such as a plurality of cloud services of the cloud system 20, may be used by using the same authentication information. However, different types of authentication information may be used for different cloud services provided by the same cloud provider. When a cloud system other than the cloud system 20 is usable, environment setting information corresponding to the cloud system is stored in the environment setting storage unit 121.

The program storage unit 122 stores a source code of a program before conversion created according to an input from the developer. The program storage unit 122 also stores a program group after conversion for the cloud system 20 generated from the program before conversion. The program storage unit 122 also stores information indicating a constraint condition input from the developer. The constraint condition indicates a request or a constraint designated by the developer in generating the program after conversion.

The conversion rule storage unit 123 stores a plurality of conversion rules for converting a program for a single server into a distributed processing program for the cloud system 20. Each conversion rule includes a code pattern, a template, a usable service, and the cost. The template is a model of a program in which an argument is used to describe a process for using the cloud service. A value extracted from the program before conversion or the environment setting information may be assigned to the argument of the template to generate the program after conversion. The code pattern indicates a kind of code (set of commands) included in the program before conversion to which the template can be applied. The template is used to convert the code corresponding to the code pattern in the program before conversion into a code for the cloud. The usable service is an identification name of the cloud service usable for the code pattern. There is a template for each usable service. There may be a plurality of usable services for one code pattern. The cost is a cost when the usable service is used. An example of the cost is an expense (billing amount) charged to the user from the cloud provider regarding the use of the service.

The execution state storage unit 124 stores execution state information indicating the execution state of the service instance. One or more service instances may be started from a program group after conversion. Unique identification information is provided to each service instance. The execution state of the service instance is one of none, running, terminated, and removed.

The development UI unit 131 provides a user interface to the client 11 and receives various inputs from the client 11. For example, the development UI unit 131 transmits, to the client 11, screen information indicating a web page for development displayed on a web browser and receives, from the client 11, data input on the web page. It may be stated that the development UI unit 131 provides an integrated development environment (IDE) to the client 11, and the IDE may also be referred to as a cloud IDE.

The development UI unit 131 receives the environment setting information from the client 11 and saves the received environment setting information in the environment setting storage unit 121. The development UI unit 131 also receives an input of a program from the client 11 and updates the program before conversion stored in the program storage unit 122. The development UI unit 131 also receives an input of a constraint condition from the client 11 and stores the constraint condition in the program storage unit 122. The constraint condition is information indicating a given constraint (for example, maximum amount of charged expense) reflecting a policy of the user regarding the use of the cloud service. The development UI unit 131 also receives a program conversion request from the client 11 and instructs the compilation unit 132 to convert the program. The development UI unit 131 also receives an execution state changing request from the client 11 and instructs the start control unit 133 to install, terminate, or remove the service instance.

The compilation unit 132 provides a program conversion service (compiler service). Although both the development UI unit 131 and the compilation unit 132 are arranged on the development server 100 in FIG. 4, the compilation unit 132 may be arranged on a server computer different from the development UI unit 131. The compilation unit 132 converts a program for a single server into a distributed processing program for the cloud system 20 according to an instruction from the development UI unit 131. In this case, the compilation unit 132 reads the program before conversion from the program storage unit 122 and analyzes the code included in the program before conversion to specify the set of cloud services to be used. The compilation unit 132 then refers to the environment setting storage unit 121 and the conversion rule storage unit 123 to generate a program group after conversion according to the specified set of cloud services and saves the generated program group after conversion in the program storage unit 122.

The compilation unit 132 includes a service selection unit 134 and a code generation unit 135. The service selection unit 134 uses pattern matching to detect the code that can apply the conversion rule stored in the conversion rule storage unit 123 from the program before conversion. The pattern matching is performed by comparing the code included in the program before conversion and the code pattern included in the conversion rule. For each detected code, the service selection unit 134 extracts a plurality of candidates for usable cloud services from the conversion rule. For each code (or code pattern), there may be a plurality of candidates for cloud services. The service selection unit 134 specifies the set of cloud services to be used from the plurality of candidates in each extracted code based on the constraint condition input by the user. The code generation unit 135 applies the values extracted from the detected codes and the environment setting information stored in the environment setting storage unit 121 to the templates of the conversion rules corresponding to the cloud services belonging to the specified set to generate the program after conversion.

The start control unit 133 provides a start service (launcher service) of service instances. Although both the development UI unit 131 and the start control unit 133 are arranged on the development server 100 in FIG. 4, the start control unit 133 may be arranged on a server computer different from the development UI unit 131. The compilation unit 132 and the start control unit 133 may be arranged on different server computers. The start control unit 133 reads the program group after conversion from the program storage unit 122 according to an instruction from the development UI unit 131 and uses the program group after conversion to install, terminate, or remove the service instances. The start control unit 133 also updates the execution state information stored in the execution state storage unit 124.

When a new service instance is installed on the cloud system 20, the start control unit 133 provides a unique service instance ID to the service instance. The start control unit 133 converts constituent element names, such as the function name and the container name described in the program group after conversion, into unique names to reduce conflict with existing service instances installed on the cloud system 20. For example, the start control unit 133 converts the constituent element names to include the provided service instance ID.

In the installation of the service instance, the start control unit 133 transmits a creation request to each subsystem providing the service to be used, according to a given term (for example, using a given API). The creation request may include the generated program after conversion and other setting information. For example, the application program executed on the platform is transmitted to the PaaS system 21, and the function program is transmitted to the FaaS system 22.

In the termination of the service instance, the start control unit 133 transmits a deletion request to each subsystem at the installation location of the service instance according to a given term. As a result, the information regarding the service instance is deleted from the subsystems, such as the PaaS system 21 and the FaaS system 22. The service instance in the terminated state may be installed again, and the data saved in the subsystem providing the storage service, such as the storage system 23, is not deleted yet. In the removal of the service instance, the start control unit 133 transmits a deletion request to the subsystem providing the storage service, such as the storage system 23, according to a given term. As a result, the data saved in the subsystem providing the storage service is deleted.

FIG. 5 depicts an example of an environment setting management table. An environment setting management table 141 is stored in the environment setting storage unit 121. The environment setting management table 141 includes items of cloud system name and authentication information. The name of the cloud system or the name of the cloud provider is registered in the item of cloud system name. "A system" in FIG. 5 represents the cloud system 20. The authentication information input from the developer is registered in the item of authentication information. It is assumed in FIG. 5 that the same authentication information may be used to use various subsystems, such as the PaaS system 21, the FaaS system 22, and the storage system 23. The authentication information of a plurality of cloud systems may be registered in the environment setting management table 141, and the authentication information input from different developers may be registered in the environment setting management table 141.

The type of information used for the authentication varies depending on the cloud system. For example, information including access key ID "xxx," secret access key "yyy," region "us-west-2," and account ID "123" is registered for the cloud system 20.

FIG. 6 depicts an example of the program before conversion and the constraint condition. A program 142 is stored in the program storage unit 122. The program 142 is a program before conversion created based on an input from the developer. In FIG. 6, the program 142 is created as a server-side script in a Node.js format.

The program 142 uses an Express module that controls communication using hypertext transfer protocol (HTTP) and a BodyParser module that extracts data of a POST method from an HTTP request. The program 142 waits for the HTTP request through port 3000 of transmission control protocol (TCP), and a function "app.post" is executed when the HTTP request of the POST method including "/csv" in uniform resource locator (URL) is received.

In "app.post," the data name and the comma separated value (CSV) text are extracted from the HTTP request, and the CSV text is assigned to the variable "csv" in association with the data name. A comma-separated character string is extracted from each line of the CSV text and assigned to the variable "record," and the comma-separated character string is divided into a plurality of parts with the commas as dividing positions. An email is transmitted to a given email address, and an HTTP response corresponding to the HTTP request is returned.

A constraint condition 143 is stored in the program storage unit 122. The constraint condition 143 is information received from the client 11. In FIG. 6, the constraint condition 143 includes a parameter "Cost." The "Cost" is an upper limit of the billing amount permitted when the cloud service is used to execute the program 142. In FIG. 6, the upper limit of the billing amount is set to "100 yen."

Figure 7:
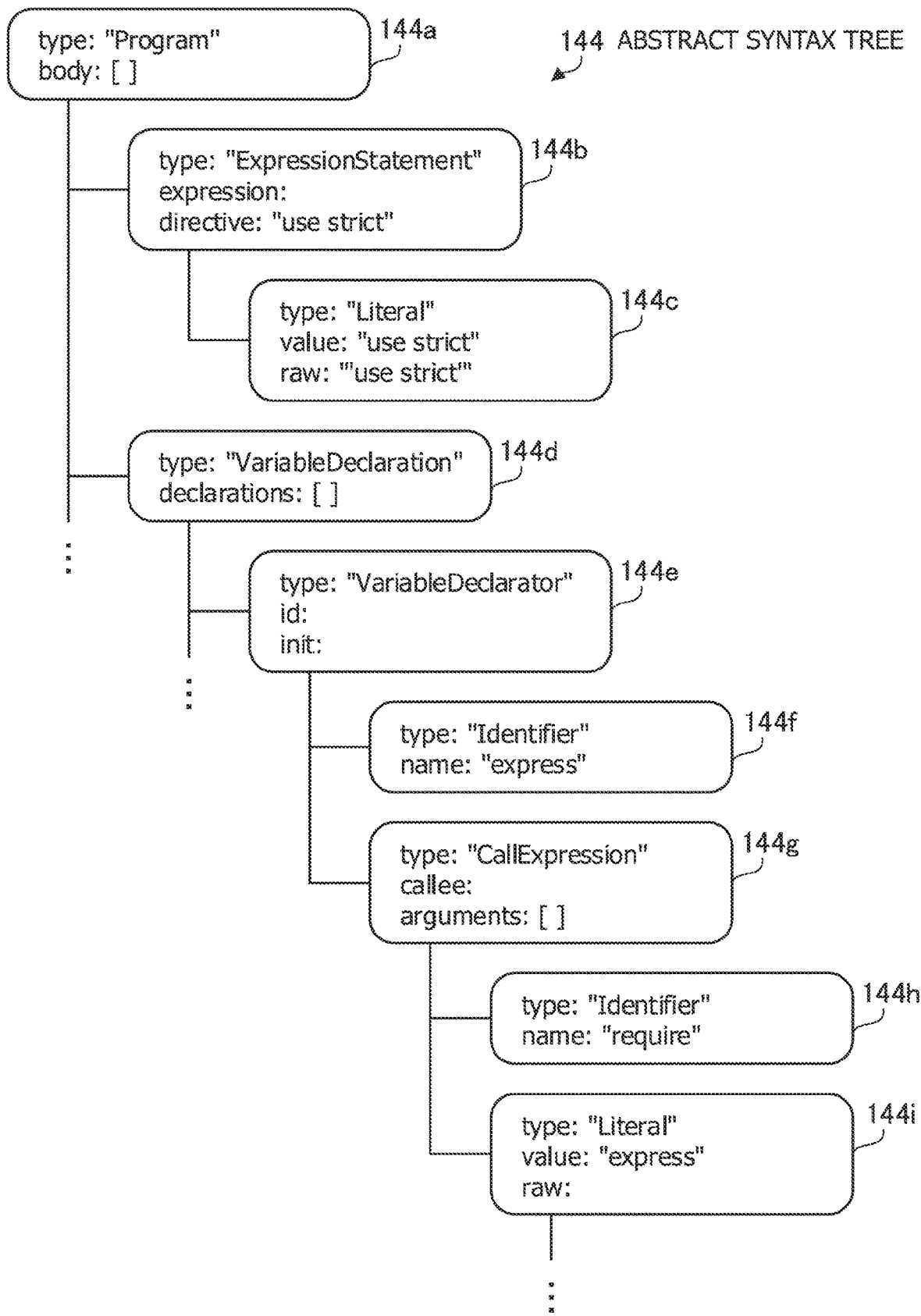
FIG. 7 depicts an example of an abstract syntax tree corresponding to the program before conversion.

FIG. 7 depicts an example of an abstract syntax tree corresponding to the program before conversion. To generate the program group after conversion from the program 142, the compilation unit 132 analyzes the program 142 to generate an abstract syntax tree 144. The abstract syntax tree 144 includes a plurality of nodes linked to a tree structure. Part of a node group generated from the program 142 of FIG. 6 is described in FIG. 7. The abstract syntax tree 144 includes nodes 144a, 144b, 144c, 144d, 144e, 144f, 144g, 144h, and 144i.

The node 144a is a root node. The node 144a is a program type, and a node related to the body is coupled under the node 144a. The node 144b is a node under the node 144a. The node 144b is an expression statement type indicating a command "use strict." The node 144c is a node under the node 144b. The node 144c is a literal type indicating a character string "use strict." The nodes 144b and 144c correspond to a first line of the program 142 in FIG. 6.

The node 144d is a node under the node 144a. The node 144d is a variable declaration type, and a node related to variable declaration is coupled under the node 144d. The node 144e is a node under the node 144d. The node 144e is a variable declaration type, and nodes related to the variable name and the initial value are coupled under the node 144e. The node 144f is a node under the node 144e. The node 144f is an identifier type indicating a variable name "express." The node 144g is a node under the node 144e. The node 144g is a call expression type, and nodes related to the function name and the argument are coupled under the node 144g.

The node 144h is a node under the node 144g. The node 144h is an identifier type indicating a function name "require." The node 144i is a node under the node 144g. The node 144i is a literal type indicating an argument "express." The nodes 144e, 144f, 144g, 144h, and 144i correspond to a second line of the program 142 of FIG. 6. In this way, lexical analysis and syntax analysis of the program 142 are performed, and the abstract syntax tree 144 indicating the structure of the program 142 is generated.

FIGS. 8A and 8B depict an example of a conversion rule table. A conversion rule table 145 is stored in the conversion rule storage unit 123. A plurality of conversion rules regarding the cloud system 20 at the installation location are registered in advance in the conversion rule table 145. The conversion rule table 145 includes items of rule ID, rule name, code pattern, usable service, application condition, template, and cost.

Identification information for identifying the conversion rule is registered in the item of rule ID. A name representing a feature of the conversion rule is registered in the item of rule name. A feature of the code as an application target of the template among the codes included in the program before conversion is registered in the item of code pattern. The code pattern may be described by using regular expression. A name of the cloud service usable for the code pattern is registered in the item of usable service. A condition other than the code pattern among the conditions for applying the template is registered in the item of application condition.

A model of the program after conversion described by using the argument is registered in the item of template. A value is assigned to the argument of the template to obtain an executable program after conversion. The value extracted from the program before conversion or the authentication information registered in the environment setting management table 141 may be used as the value of the argument. The template is not described in the program format in FIGS. 8A and 8B to simplify the description. The billing amount in using the cloud service is registered in the item of cost.

The name of the cloud service is registered in the item of usable service when there are a plurality of usable services for a code pattern, and nothing is set when there is only one usable service. In addition, information may not be set in the item of application condition or cost. A hyphen "-" is described in a section "without setting" in FIGS. 8A and 8B.

For example, conversion rules R1 to R8 are registered in the conversion rule table 145. The conversion rule R1 is "RunOnServer" and is applied to the root node in the abstract syntax tree. The conversion rule R1 includes a template for converting the code to execute the entire code in the server function called on the server execution environment.

The conversion rule R2 is "DeclareContainerA1" and may be applied to free variable declaration. The conversion rule R2 includes a template for using "container service A1" to create the container corresponding to the variable. The conversion rule R2 includes cost "C1" in using the "container service A1."

The conversion rule R3 is "DeclareContainerA2" and may be applied to free variable declaration. The conversion rule R3 includes a template for using "container service A2" to create the container corresponding to the variable. The conversion rule R3 includes cost "C2" in using the "container service A2."

The conversion rules R2 and R3 are not applied at the same time.

The conversion rule R4 is "PutInContainer" and is applied to an assignment statement for assigning a value to a variable when the conversion rule R2 or the conversion rule R3 is already applied to the variable. The conversion rule R4 includes a template for calling the PUT API to write the value to the container created by the conversion rule R2 or the conversion rule R3. The conversion rule R4 depends on the conversion rule R2 or the conversion rule R3.

The conversion rule R5 is "DeclareFunctionBehindContainerAF1" and may be applied to a statement for performing computation using the value of a variable after the assignment statement when the conversion rule R4 is already applied to the assignment statement of the variable. The conversion rule R5 includes a template for using "service AF1 of serverless function" to create the function for the FaaS system 22. The conversion rule R5 depends on the conversion rule R4. The conversion rule R5 includes cost "C3" in using the "service AF1 of serverless function."

The conversion rule R6 is "DeclareFunctionBehindContainerAF2" and may be applied to a statement for performing computation using the value of a variable after the assignment statement when the conversion rule R4 is already applied to the assignment statement of the variable. The conversion rule R6 includes a template for using "service AF2 of serverless function" to create the function for the FaaS system 22. The conversion rule R6 depends on the conversion rule R4. The conversion rule R6 includes cost "C4" in using the "service AF2 of serverless function."

The conversion rules R5 and R6 are not applied at the same time.

The conversion rule R7 is "ParallelizeForOfF1FA1" and may be applied to a for-of block. The for-of block indicates loop processing using a loop variable (iterator variable). The conversion rule R7 includes a template for using "container service FA1" to create the container corresponding to the loop variable and a template for using "service F1 of serverless function" to create the function for the FaaS system 22 corresponding to the loop processing. The conversion rule R7 includes cost "C5+C6" in using the "service F1 of serverless function" and the "container service FA1."

The cost "C5" is a cost in using the "service F1 of serverless function." The cost "C6" is a cost in using the "container service FA1."

The conversion rule R8 is "ParallelizeForOfF2FA2" and may be applied to a for-of block. The conversion rule R8 includes a template for using "container service FA2" to create the container corresponding to the loop variable and a template for using "service F2 of serverless function" to create the function for the FaaS system 22 corresponding to the loop processing. The conversion rule R8 includes cost "C7+C8" in using the "service F2 of serverless function" and the "container service FA2." The cost "C7" is a cost in using the "service F2 of serverless function." The cost "C8" is a cost in using the "container service FA2."

The conversion rules R7 and R8 are not applied at the same time.

Note that the "container service A1," the "container service A2," the "container service FA1," and the "container service FA2" are object storage services.

According to the templates of the conversion rules R7 and R8, scalable processing may be realized. The conversion rules R7 and R8 allow converting the program to automatically change the parallelism according to the load. For example, the program after conversion may be created to automatically perform the scale-out for increasing the parallelism when the load is high and to automatically perform the scale-in for reducing the parallelism when the load is low.

Figure 9:
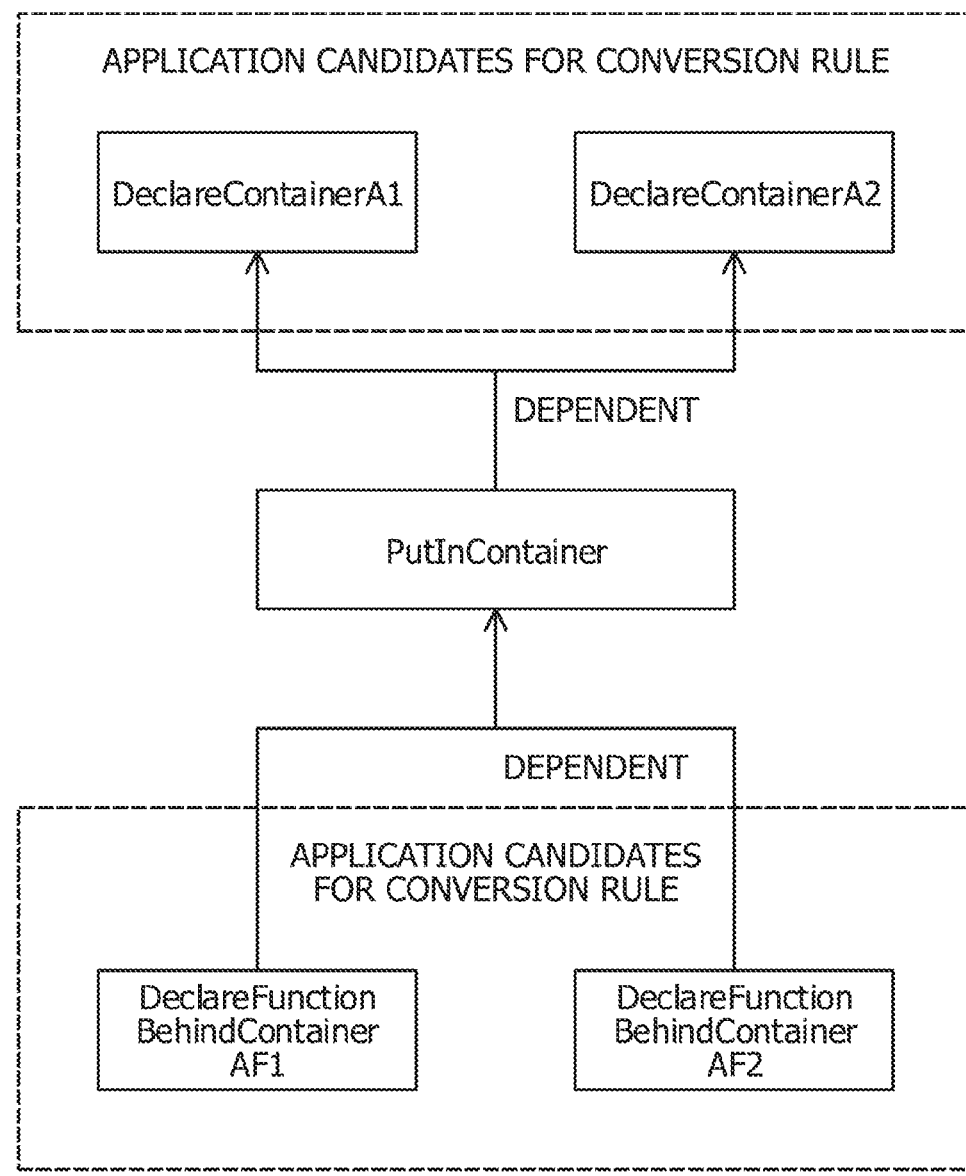
FIG. 9 depicts an example of dependence between conversion rules.

FIG. 9 depicts an example of dependence between conversion rules. FIG. 9 illustrates dependence between conversion rules according to the application conditions set in the conversion rule table 145. For example, the conversion rule "PutInContainer" depends on the conversion rule "DeclareContainerA1" or the conversion rule "DeclareContainerA2." For example, the conversion rule "PutInContainer" is applied only when the conversion rule "DeclareContainerA1" or the conversion rule "DeclareContainerA2" is already applied.

The conversion rule "DeclareFunctionBehindContainerAF1" and the conversion rule "DeclareFunctionBehindContainerAF2" depend on the conversion rule "PutInContainer." For example, the conversion rule "DeclareFunctionBehindContainerAF1" or the conversion rule "DeclareFunctionBehindContainerAF2" is applied only when the conversion rule "PutInContainer" is already applied.

FIG. 10 depicts an example of a relation between the program before conversion and the conversion rules. The correspondence between the conversion rules registered in the conversion rule table 145 and the codes in the program 142 is as follows. Line numbers provided on the left side of the program 142 indicate the codes in the program 142.

The code in line 7 of the program 142 corresponds to the code pattern "free variable declaration." Therefore, the conversion rule "DeclareContainerA1" or the conversion rule "DeclareContainerA2" is applied to the code in line 7 of the program 142.

The code in line 15 of the program 142 corresponds the code pattern "assignment statement for variable." Therefore, the conversion rule "PutInContainer" is applied to the code in line 15 of the program 142.

The codes in lines 12 to 24 of the program 142 correspond to the code pattern "statement for using variable after assignment." Therefore, the conversion rule "DeclareFunctionBehindContainerAF1" or the conversion rule "DeclareFunctionBehindContainerAF2" is applied to the codes in lines 12 to 24 of the program 142.

The codes in lines 16 to 22 of the program 142 correspond to the code pattern "for-of block." Therefore, the conversion rule "ParallelizeForOfF1FA1" or "ParallelizeForOfF2FA2" is applied to the codes in lines 16 to 22 of the program 142.

FIG. 11 depicts an example of the template included in the conversion rule table. A template 145a is a template included in the conversion rule R4 ("PutInContainer") of FIGS. 8A and 8B. The template 145a includes arguments "accessKeyID," "secretAccessKey," and "region." These three arguments correspond to an access key ID, a secret access key, and a region registered in the environment setting management table 141. The template 145a also includes arguments "object.name," "property.name," and "right." These three arguments correspond to a variable name, a key, and an assigned value extracted from the program before conversion.

According to the template 145a, the access key ID and the secret access key are used to access the storage system 23 of the cloud system 20 to obtain a program after conversion for writing data in a key-value format to the container corresponding to the variable.

FIG. 12 depicts an example of the program after conversion. A program 146 is stored in the program storage unit 122. The program 146 is a program after conversion generated from the environment setting management table 141, the program 142, and the template 145a. The "xxx" in the environment setting management table 141 is assigned to the argument "accessKeyId." The "yyy" in the environment setting management table 141 is assigned to the argument "secretAccessKey." The "us-west-2" in the environment setting management table 141 is assigned to the argument "region." The "csv" in the program 142 is assigned to the argument "object.name." The "name" in the program 142 is assigned to the argument "property.name." The "object" in the program 142 is assigned to the argument "right."

According to the program 146, the access key ID "xxx" and the secret access key "yyy" are used to access the storage system 23 to write the value of the variable "object" to the container "csv" in association with the value of the variable "name." The program 146 is installed and executed by, for example, the PaaS system 21.

Figure 13:
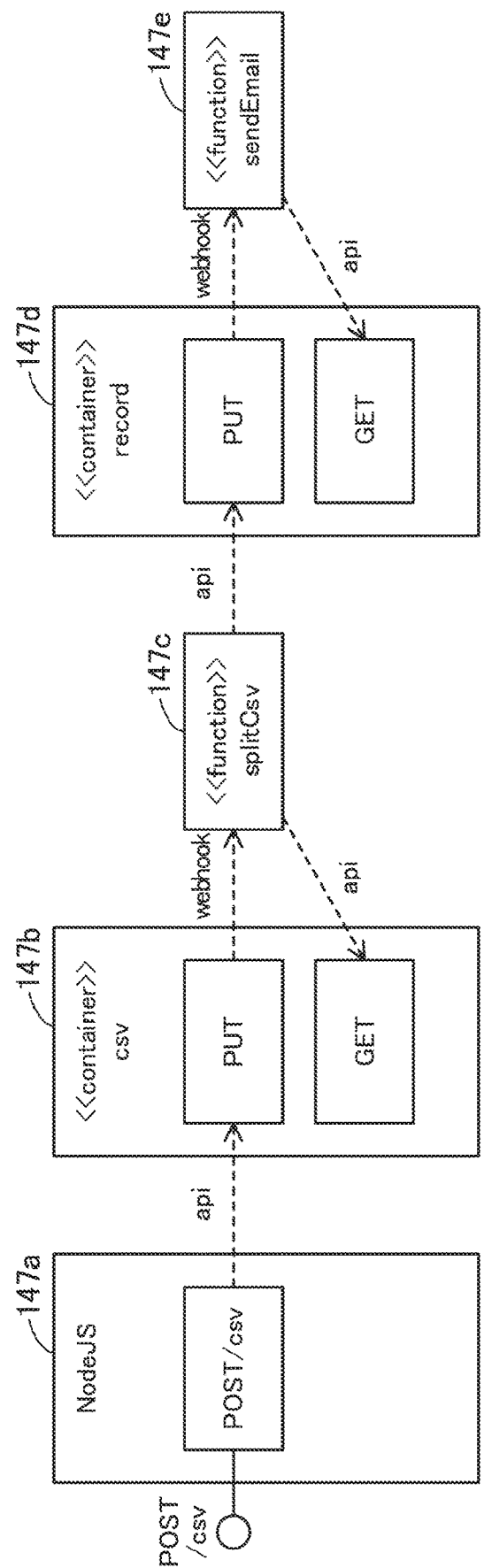
FIG. 13 depicts an example of components included in the program after conversion.

FIG. 13 depicts an example of components included in the program after conversion. According to the program group after conversion generated from the program 142, the application software includes components 147a, 147b, 147c, 147d, and 147e.

The component 147a is an application program for starting a series of processes according to reception of an HTTP request. The component 147a includes: an interface for receiving an HTTP request of the POST method designating the URL including "/csv"; and a function for processing the HTTP request. The component 147b is a container with container name "csv." The component 147b includes a PUT API for writing data and a GET API for reading data. The component 147c is a function for FaaS with function name "splitCsv." The component 147d is a container with container name "record." The component 147d includes a PUT API for writing data and a GET API for reading data. The component 147e is a function for FaaS with function name "sendEmail."

The component 147a is executed by the PaaS system 21. The components 147c and 147e are executed by the FaaS system 22. The components 147b and 147d are executed by the storage system 23. The component 147a calls the API of the component 147b to write data. Once the data is written, the component 147c is started by a webhook. The component 147c calls the API of the component 147b to read the data and calls the API of the component 147*d* to write the data. Once the data is written, the component 147*e* is started by webhook. The component 147*e* calls the API of the component 147*d* to read the data and transmits an email.

The conversion rule R1 of FIGS. 8A and 8B is first applied from the program 142, and the component 147*a* is generated. Next, the conversion rule R2 or the conversion rule R3 of FIGS. 8A and 8B is applied to "var csv={ }" of the program 142, and the component 147*b* is generated. The conversion rule R4 of FIGS. 8A and 8B is applied to "csv[name]=object" of the program 142 to make an update such that the component 147*a* calls the component 147*b*.

Next, the conversion rule R5 or the conversion rule R6 of FIGS. 8A and 8B is applied to "csv[name].split" of the program 142, and the component 147*c* is generated. The conversion rule R7 or the conversion rule R8 of FIGS. 8A and 8B is applied to "for ( . . . record of . . . ) { . . . }" of the program 142, and the components 147*d* and 147*e* are generated. An update is made such that the component 147*c* calls the component 147*d*.

When a plurality of conversion rules are application candidates for a code pattern, one conversion rule of the plurality of application candidates is applied. Which conversion rule is to be used is decided by the constraint condition 143 and the cost of each usable service registered in the conversion rule table 145.

Figure 14:
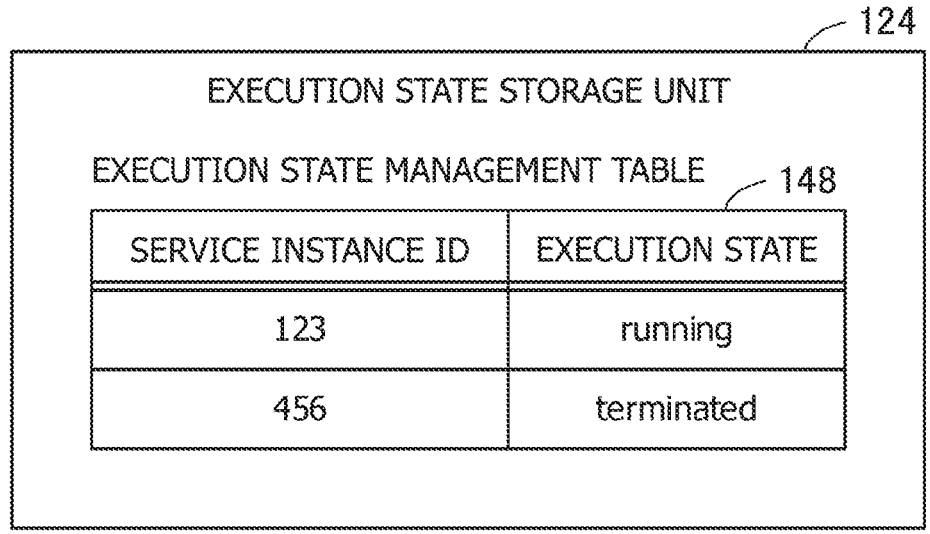
FIG. 14 depicts an example of an execution state management table.

FIG. 14 depicts an example of an execution state management table. An execution state management table 148 is stored in the execution state storage unit 124. The execution state management table 148 includes items of service instance ID and execution state. The identification information for identifying the service instance is registered in the item of service instance ID. The service instance ID is provided to a service instance to reduce overlap with other service instances when the service instance is first installed.

The state of service instance is registered in the item of execution state. The execution state is one of none, running, terminated, and removed. "None" indicates that the service instance has not been installed on the cloud system 20. "Running" indicates that the service instance is installed on the cloud system 20 and is executable. "Terminated" indicates that although the service instance is terminated, the data is not removed yet, and the service instance may be installed again. "Removed" indicates that the data is removed, and the service instance will not be installed again.

Figure 15:
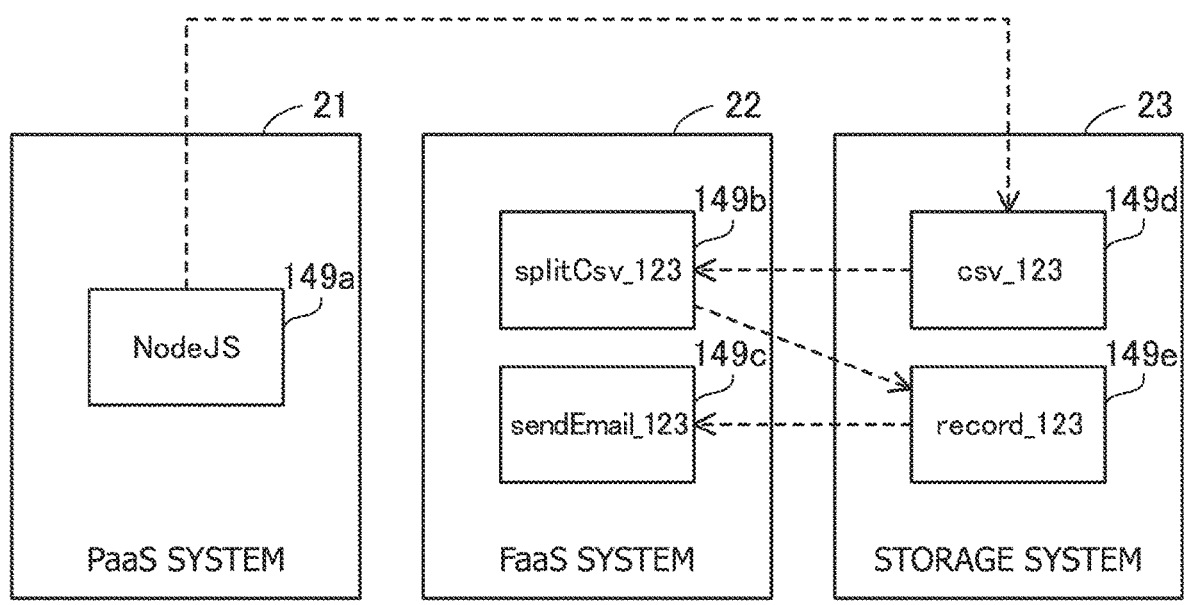
FIG. 15 depicts an example of installation of instances.

FIG. 15 depicts an example of installation of instances. Instances 149*a*, 149*b*, 149*c*, 149*d*, and 149*e* as constituent elements of the service instances are formed in the cloud system 20. The instance 149*a* is executed by the PaaS system 21. The instances 149*b* and 149*c* are executed by the FaaS system 22. The instances 149*d* and 149*e* are executed by the storage system 23. The instance 149*a* is started from the component 147*a*. The instance 149*b* is started from the component 147*c*. The instance 149*c* is started from the component 147*e*. The instance 149*d* is started from the component 147*b*. The instance 149*e* is started from the component 147*d*.

Once the instance 149*a* receives an HTTP request, the instance 149*a* starts the process and transmits data to the instance 149*d*. Once the instance 149*d* saves the data, the instance 149*b* starts the process. The instance 149*b* receives the data from the instance 149*d* and transmits the data to the instance 149*e*. Once the instance 149*e* saves the data, the instance 149*c* starts the process and receives the data from the instance 149*e*.

When the development server 100 receives an installation request from the client 11, the instances 149*a*, 149*b*, 149*c*, 149*d*, and 149*e* are formed as in FIG. 15. It is assumed here that the service instance ID of the service instance to be installed is "123." The function name of the instance 149*b* is changed to, for example, "splitCsv_123" to include the service instance ID. The function name of the instance 149*c* is changed to "sendEmail_123" to include the service instance ID. The container name of the instance 149*d* is changed to "csv_123" to include the service instance ID. The container name of the instance 149*e* is changed to "record_123" to include the service instance ID.

Subsequently, when the development server 100 receives a termination request from the client 11, the instance 149*a* is deleted from the PaaS system 21, and the instances 149*b* and 149*c* are deleted from the FaaS system 22. However, to keep the data, the instances 149*d* and 149*e* of the storage system 23 are not deleted. Subsequently, when the development server 100 receives a removal request from the client 11, the instances 149*d* and 149*e* are deleted from the storage system 23.

Next, a processing procedure of the development server 100 will be described.

Figure 16A:
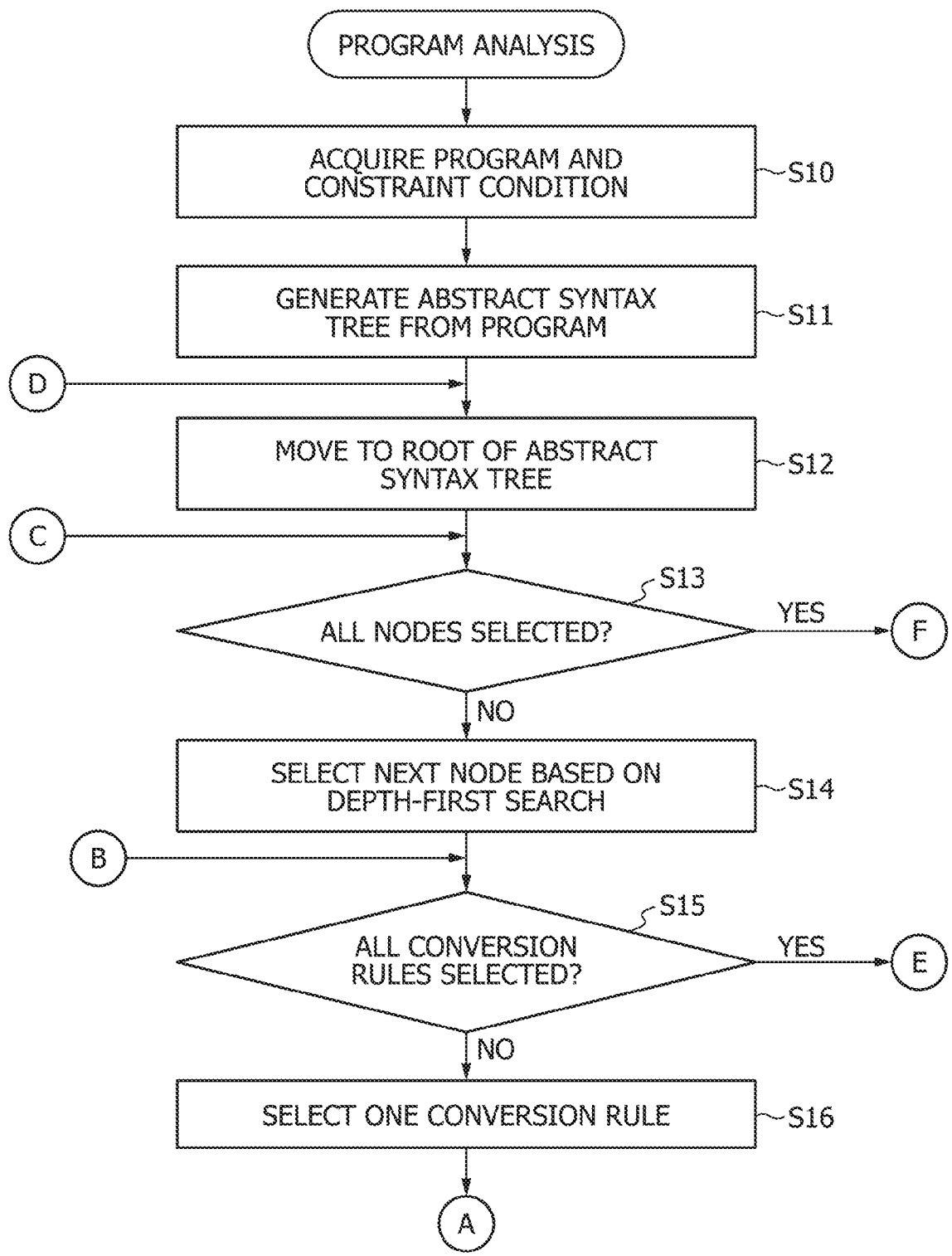
FIGS. 16A and 16B are a flow chart illustrating an example of a procedure of program analysis.
Figure 16B:
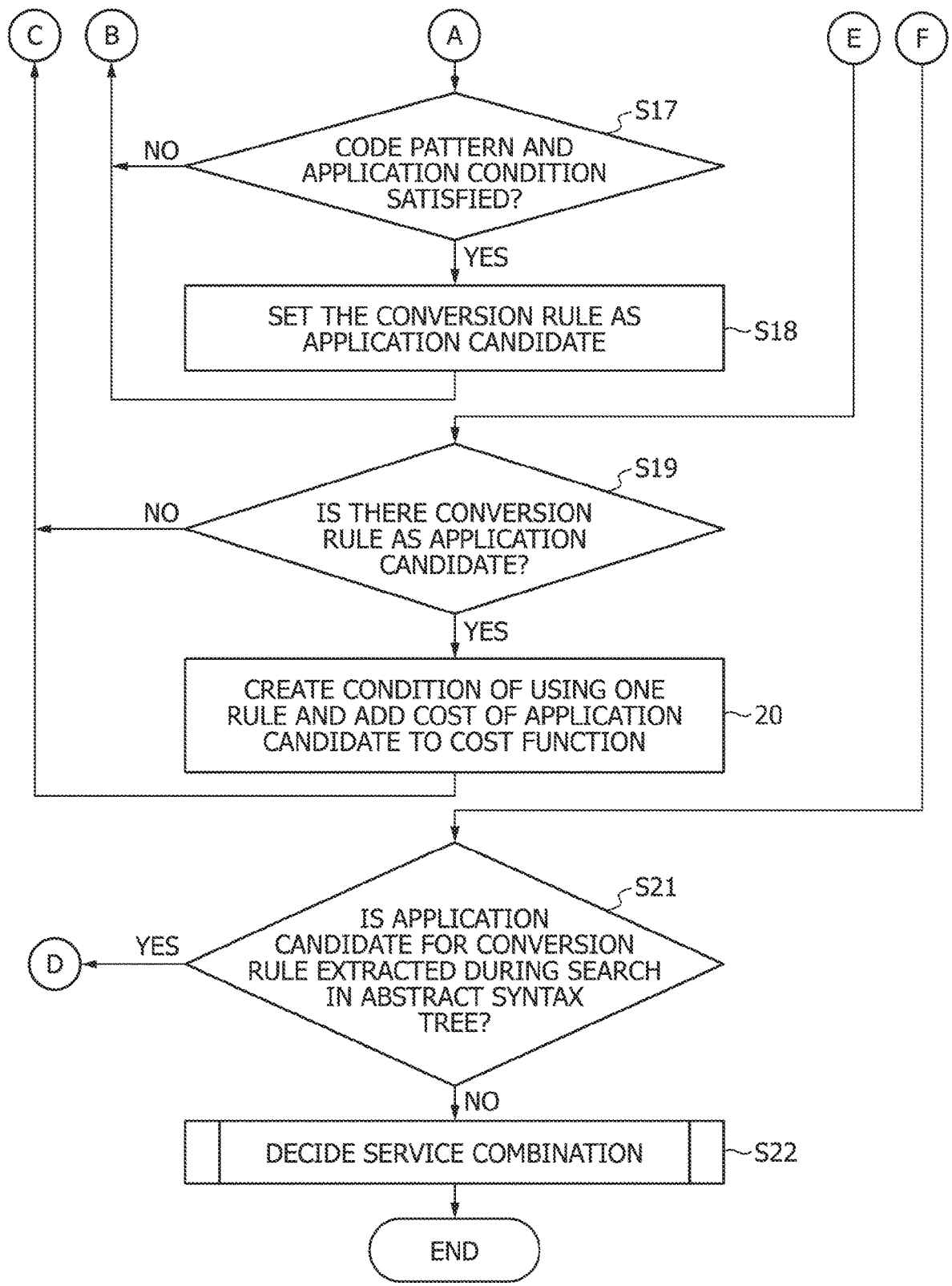

FIGS. 16A and 16B are a flow chart illustrating an example of a procedure of program analysis.

(S10) The compilation unit 132 acquires the program before conversion and the constraint condition 143.

(S11) The service selection unit 134 uses lexical analysis, syntax analysis, and the like to analyze the program before conversion and generates an abstract syntax tree indicating the structure of the program before conversion.

(S12) The service selection unit 134 moves the position of interest to the root of the abstract syntax tree.

(S13) The service selection unit 134 determines whether all nodes included in the abstract syntax tree are selected based on depth-first search started from the root performed from most recent step S12. The process proceeds to step S21 if all nodes of the abstract syntax tree are selected, and the process proceeds to step S14 if there is an unselected node.

(S14) The service selection unit 134 uses the depth-first search from the current position of interest to select the next node and moves the position of interest to the selected node. If the current position of interest is the root, the service selection unit 134 selects the root node. If the current position of interest is one of the nodes, and there is a child node under the node, the service selection unit 134 selects the child node. If the current position of interest is a node other than the root node, and there is no child node under the node, the service selection unit 134 returns the position of interest to a parent node including an unselected child node and selects the unselected child node.

(S15) The service selection unit 134 determines whether all conversion rules registered in the conversion rule table 145 are selected for the node selected in step S14. The process proceeds to step S19 if all conversion rules are selected, and the process proceeds to step S16 if there is an unselected conversion rule.

(S16) The service selection unit 134 selects an unselected conversion rule from the plurality of conversion rules registered in the conversion rule table 145.

(S17) The service selection unit 134 determines whether the node selected in step S14 satisfies the code pattern of the conversion rule selected in step S16. The service selection unit 134 also determines whether the constraint condition 143 and other program conversion situations satisfy the application condition of the conversion rule selected in step S16. The process proceeds to step S18 if both the code pattern and the application condition are satisfied. The process proceeds to step S15 if at least one of the code pattern and the application condition is not satisfied. In the determination of whether the application condition is satisfied in step S17, the service selection unit 134 may assume that a conversion rule as a prerequisite for the conversion rule selected in step S16 is already applied if the conversion rule as a prerequisite is already selected as an application candidate regarding the program before conversion. The determination for extracting the application candidate is performed here, and whether to actually apply the application candidate is determined in a process of a later stage.

(S18) The service selection unit 134 selects the conversion rule selected in step S16 as an application candidate. The process then proceeds to step S15.

(S19) The service selection unit 134 determines whether there is a conversion rule as an application candidate regarding the node at the current position of interest. The process proceeds to step S20 if there is a conversion rule as an application candidate regarding the node at the current position of interest, and the process proceeds to step S13 if there is no conversion rule as an application candidate.

(S20) The service selection unit 134 creates a condition of using one rule for the node at the current position of interest. The service selection unit 134 also adds the cost of the conversion rule as an application candidate to the cost function. The "condition of using one rule" is a condition for selecting one conversion rule when there are a plurality of conversion rules as application candidates. The "condition of using one rule" may not be created for the node at the current position of interest when there is one conversion rule as an application candidate. The "cost function" is a function for selecting a conversion rule (or a service corresponding to the conversion rule) such that the cost does not exceed the total cost indicated by the constraint condition 143. The details of the cost function will be described later. The service selection unit 134 may further create a condition corresponding to the dependence between conversion rules when there is a conversion rule as a prerequisite for another conversion rule. The process then proceeds to step S13.

(S21) The service selection unit 134 determines whether the conversion rule is applied to one or more nodes of the abstract syntax tree during the depth-first search performed from most recent step S12. If there is a node subjected to the conversion rule, the service selection unit 134 returns to step S12 and executes the depth-first search of the abstract syntax tree again. If there is no node subjected to the conversion rule, the process proceeds to step S22.

(S22) Based on the constraint condition 143 and the cost function, the service selection unit 134 decides a combination of services to be used from the plurality of application candidates for conversion rules found out for the program before conversion. The program analysis then ends.

Figure 17:
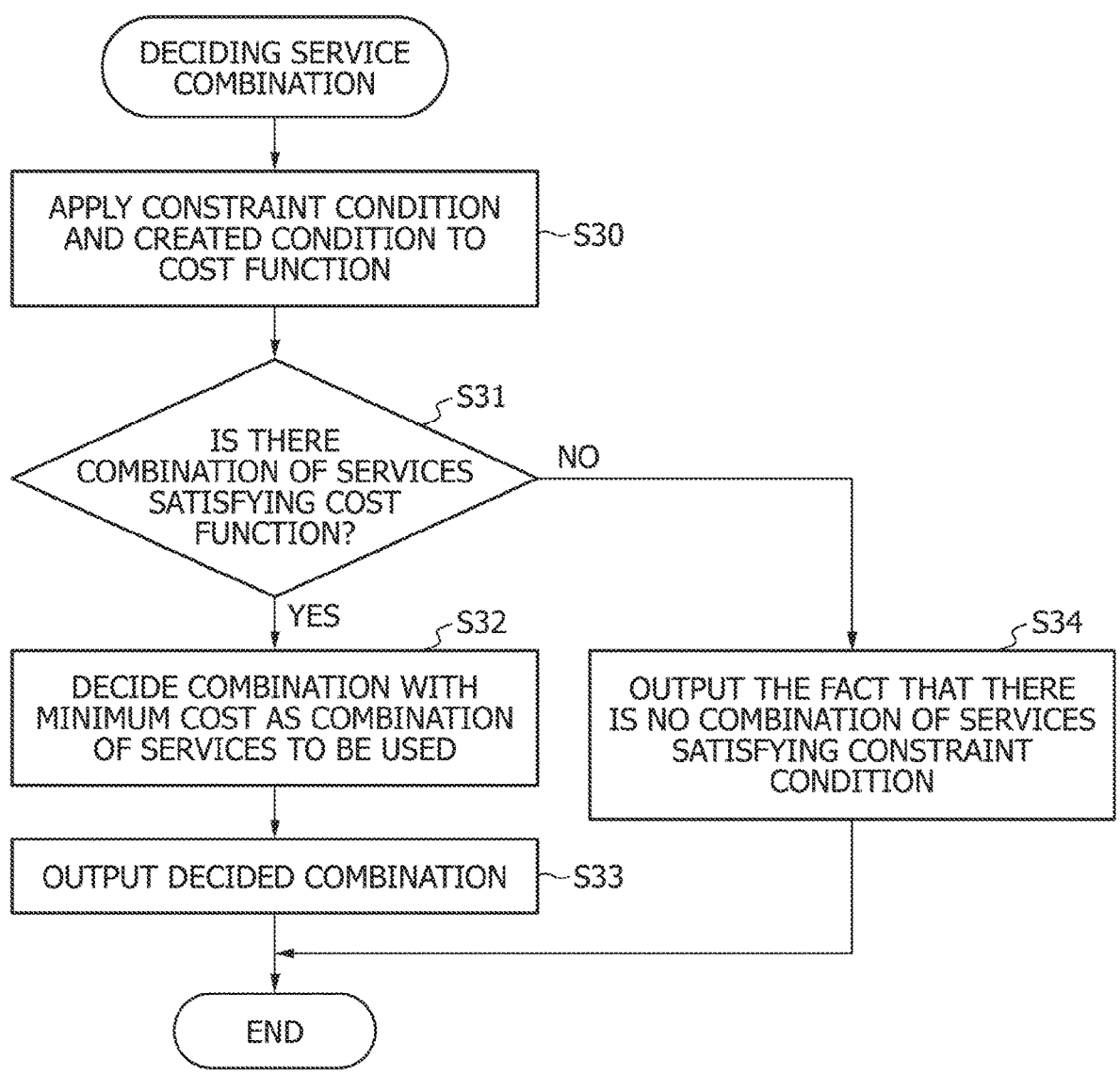
FIG. 17 is a flow chart illustrating an example of a procedure of deciding a service combination.

FIG. 17 is a flow chart illustrating an example of a procedure of deciding the service combination. The procedure of deciding the service combination is executed in step S22 described above.

(S30) The service selection unit 134 applies the constraint condition 143 and the condition created in step S20 to the cost function.

(S31) The service selection unit 134 determines whether there is a combination of services satisfying the cost function. The process proceeds to step S32 if there is a combination of services satisfying the cost function, and the process proceeds to step S34 if there is no combination of services satisfying the cost function.

(S32) The service selection unit 134 decides that the combination with the minimum cost is the combination of services to be used. For example, when there are a plurality of combinations of services satisfying the cost function, the service selection unit 134 decides that the combination with the minimum cost among the plurality of combinations is the combination to be used.

(S33) The service selection unit 134 outputs the decided combination. For example, the service selection unit 134 generates screen information including the combination decided in step S32 and transmits the generated screen information to the client 11. The combination of services to be used is displayed on the web browser of the client 11 based on the screen information. The procedure of deciding the service combination then ends.

(S34) The service selection unit 134 outputs the fact that there is no combination of services satisfying the constraint condition. For example, the service selection unit 134 transmits, to the client 11, a message indicating that there is no combination of services satisfying the constraint condition. The content of the message is displayed on the web browser of the client 11. The procedure of deciding the service combination then ends.

In this way, the service selection unit 134 refers to the conversion rule table 145 indicating the candidates for services and the cost regarding the code pattern to decide the cost function according to the constraint condition 143 and to decide a plurality of candidates for services corresponding to the program before conversion. The service selection unit 134 then specifies a set of services to be used by the user from the plurality of candidates based on the cost function.

The cost function includes computation (or arithmetic expression) for the costs of the plurality of candidates for services. The service selection unit 134 generates a conditional expression indicating the condition for selecting a first candidate and a second candidate among the plurality of candidates for services and specifies the set of services based on the computation with the conditional expression. As a result, a service may be appropriately selected when there are a plurality of conflicting services regarding a code pattern.

As described, the conversion rule table 145 includes a plurality of first candidates for services regarding a first code pattern and a plurality of second candidates for services regarding a second code pattern. The service selection unit 134 selects one of the plurality of first candidates regarding the first code pattern included in the program before conversion and selects one of the plurality of second candidates regarding the second code pattern included in the program before conversion. As a result, a service satisfying the constraint condition 143 according to the policy of the user may be provided when there are a plurality of conflicting services regarding a code pattern.

FIG. 18 depicts an example of the cost. Only the combination of the alphabet and the number (such as "A1") at the end of the service name illustrated in FIGS. 8A and 8B is illustrated for a creatable service instance in FIG. 18. The unit of the cost is, for example, "yen."

For example, the values of the cost of the object storage services "container service A1," "container service A2," "container service FA1," and "container service FA2" are as follows. A cost C1 of the "container service A1" is 10. A cost C2 of the "container service A2" is 20. A cost C6 of the "container service FA1" is 10. A cost C8 of the "container service FA2" is 30.

The values of the cost of the FaaS services "service F1 of serverless function," "service F2 of serverless function," "service AF1 of serverless function," and "service AF2 of serverless function" are as follows. A cost C5 of the "service F1 of serverless function" is 20. A cost C7 of the "service F2 of serverless function" is 50. A cost C3 of the "service AF1 of serverless function" is 30. A cost C4 of the "service AF2 of serverless function" is 50.

FIGS. 19A to 19C depict an example of the cost function. FIG. 19A indicates variables used for the cost function and the meaning of the values set for the variables. A variable A1 is a variable indicating whether to use the "container service A1." A variable A2 is a variable indicating whether to use the "container service A2." A variable FA1 is a variable indicating whether to use the "container service FA1." A variable FA2 is a variable indicating whether to use the "container service FA2." A variable F1 is a variable indicating whether to use the "service F1 of serverless function." A variable F2 is a variable indicating whether to use the "service F2 of serverless function." A variable AF1 is a variable indicating whether to use the "service AF1 of serverless function." A variable AF2 is a variable indicating whether to use the "service AF2 of serverless function." In each of the variables A1, A2, FA1, FA2, F1, F2, AF1, and AF2, "True" indicates that the service is to be used, and "False" indicates that the service is not to be used.

FIG. 19B illustrates conditions regarding the selection of services. The conditions are created in step S20 described above. For example, a conditional expression "A1 xor A2=True" representing a condition indicates that one of the two conflicting services "container service A1" and "container service A2" is to be selected and used. According to the conversion rule table 145, other conditional expressions "AF1 xor AF2=True," "FA1 xor FA2=True," and "F1 xor F2=True" are also created.

Note that conditional expressions other than the conditional expressions for selecting one of two conflicting services may also be created. For example, a complicated conditional expression "A1 and (A5 xor A6)=True" (one of "service A5" and "service A6" is used when "container service A1" is used) may also be created.

FIG. 19C illustrates an example of the cost function created for the program 142. The cost function (or arithmetic expression of cost function) is represented by "A1*C1+A2*C2+FA1*C6+FA2*C8+F1*C5+F2*C7+AF1*C3+AF2*C4<=C." C is a value of "Cost" input by the constraint condition 143.

The term "A1*C1" is "C1" when "A1" is "True" and is "0" when "A1" is "False." According to the conditional expression "A1 xor A2=True," "A2" is "False" when "A1" is "True," and "A2" is "True" when "A1" is "False." This also applies to the other terms of the cost function.

FIGS. 20A to 20C depict an example of determination based on the cost function. It is determined whether the total cost of each set of services permitted by the cost function of FIG. 19C satisfies the cost function with respect to the value of each cost in FIG. 18, C=100, and the conditional expression of FIG. 19B.

FIG. 20A illustrates a case (pattern a) in which a set of services A2, AF1, F2, and FA2 is selected. In the case of the pattern a, C2+C3+C7+C8=20+30+50+30=130>C(=100), and the cost function is not satisfied. Therefore, the set of services A2, AF1, F2, and FA2 is rejected.

FIG. 20B illustrates a case (pattern b) in which a set of services A1, AF1, F1, and FA1 is selected. In the case of the pattern b, C1+C3+C5+C6=10+30+20+10=70<C(=100), and the cost function is satisfied. Therefore, the set of services A1, AF1, F1, and FA1 is adopted.

FIG. 20C illustrates a case (pattern c) in which a set of services A2, AF2, F1, and FA1 is selected. In the case of the pattern c, C2+C4+C5+C6=20+50+20+10=100=C(=100), and the cost function is satisfied. However, the total cost of the pattern b is lower than the total cost of the pattern c. Therefore, the pattern b is prioritized over the pattern c. The pattern b is selected, and the set of services A2, AF2, F1, and FA1 is rejected.

Figure 21:
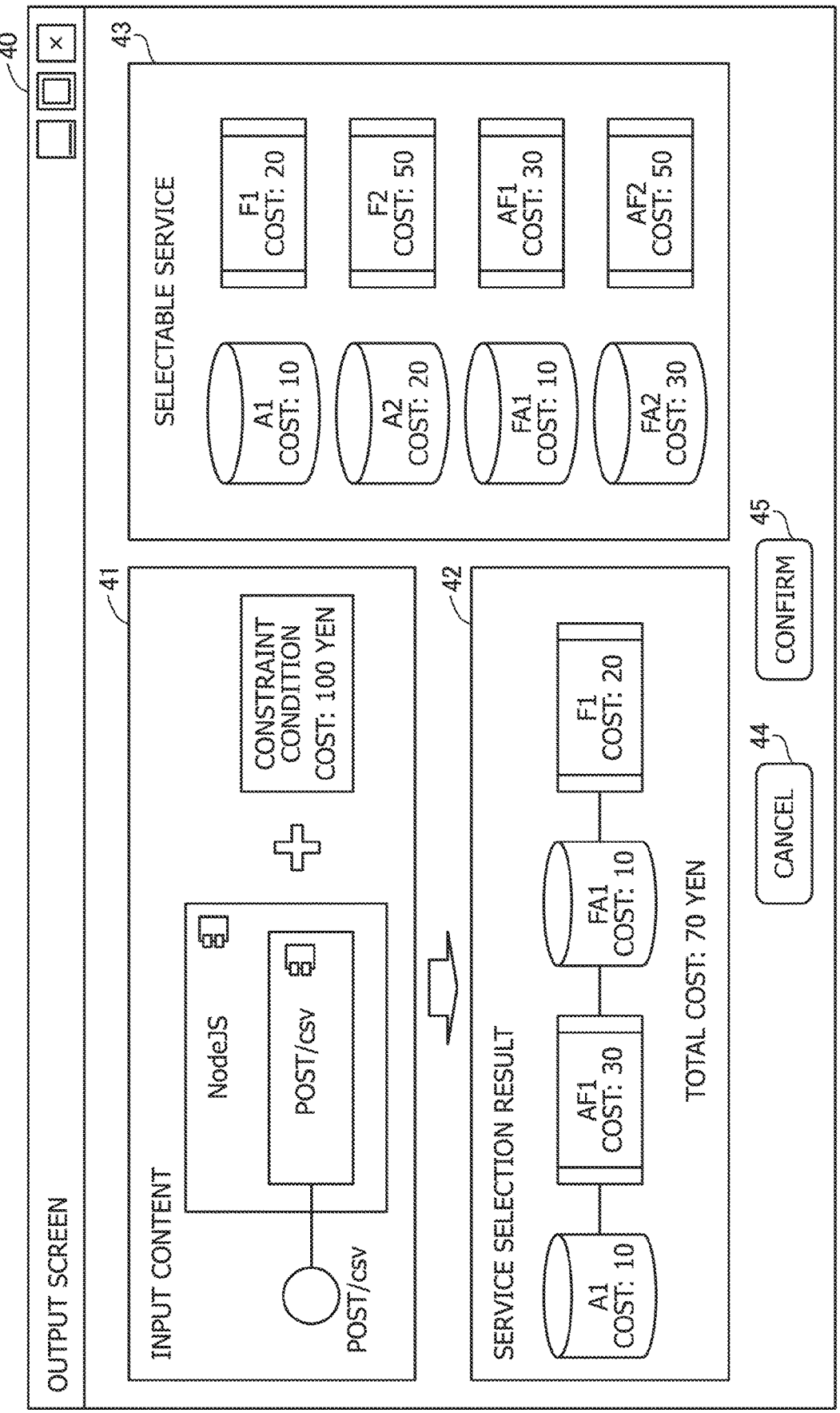
FIG. 21 depicts an example of an output screen.

FIG. 21 depicts an example of an output screen. Screen information of an output screen 40 is generated by the service selection unit 134 and transmitted to the client 11. The web browser of the client 11 receives the screen information and displays the output screen 40 on the display of the client 11.

The output screen 40 includes an input content area 41, a service selection result area 42, a selectable service area 43, a cancel button 44, and a confirmation button 45.

The input content area 41 is an area for displaying an image indicating the program 142 and the constraint condition 143 input by the user. The service selection result area 42 is an area for displaying an image indicating selection results of services selected by the development server 100. For example, an image including the set of services A1, AF1, F1, and FA1 of the pattern b in FIG. 19B, the cost of each of the services A1, AF1, F1, and FA1, and the total cost "70 yen" are displayed in the service selection result area 42.

The selectable service area 43 is an area for displaying an image indicating other selectable services. For example, the user may operate the web browser to change part of the services already selected in the service selection result area 42 to other services displayed in the selectable service area 43. The total cost is calculated again according to the change of services, and the display of the total cost is also changed.

The cancel button 44 is a button for inputting canceling of the current input content and the service selection results. For example, the user may press the cancel button 44 to cancel the current input content and the service selection results and input other input content.

The confirmation button 45 is a button for instructing the development server 100 to confirm the current input content and the service selection results, generate a program after conversion, and start each service displayed in the service selection result area 42. Once the development server 100 receives selection of the confirmation button 45, the development server 100 generates a program after conversion according to the selected set of services based on the program 142 and the conversion rule table 145. The development server 100 uses the generated program after conversion to start each of the selected services.

Next, a procedure of applying the conversion rules to the program before conversion to generate the program after conversion will be described. The conversion rules corresponding to the services confirmed on the output screen 40 are used as the conversion rules. For example, when the set of services A1, AF1, F1, and FA1 is selected, the conversion rules to be applied to the program before conversion are the conversion rules R1, R2, R4, R5, and R7 of FIGS. 8A and 8B.

Figure 22:
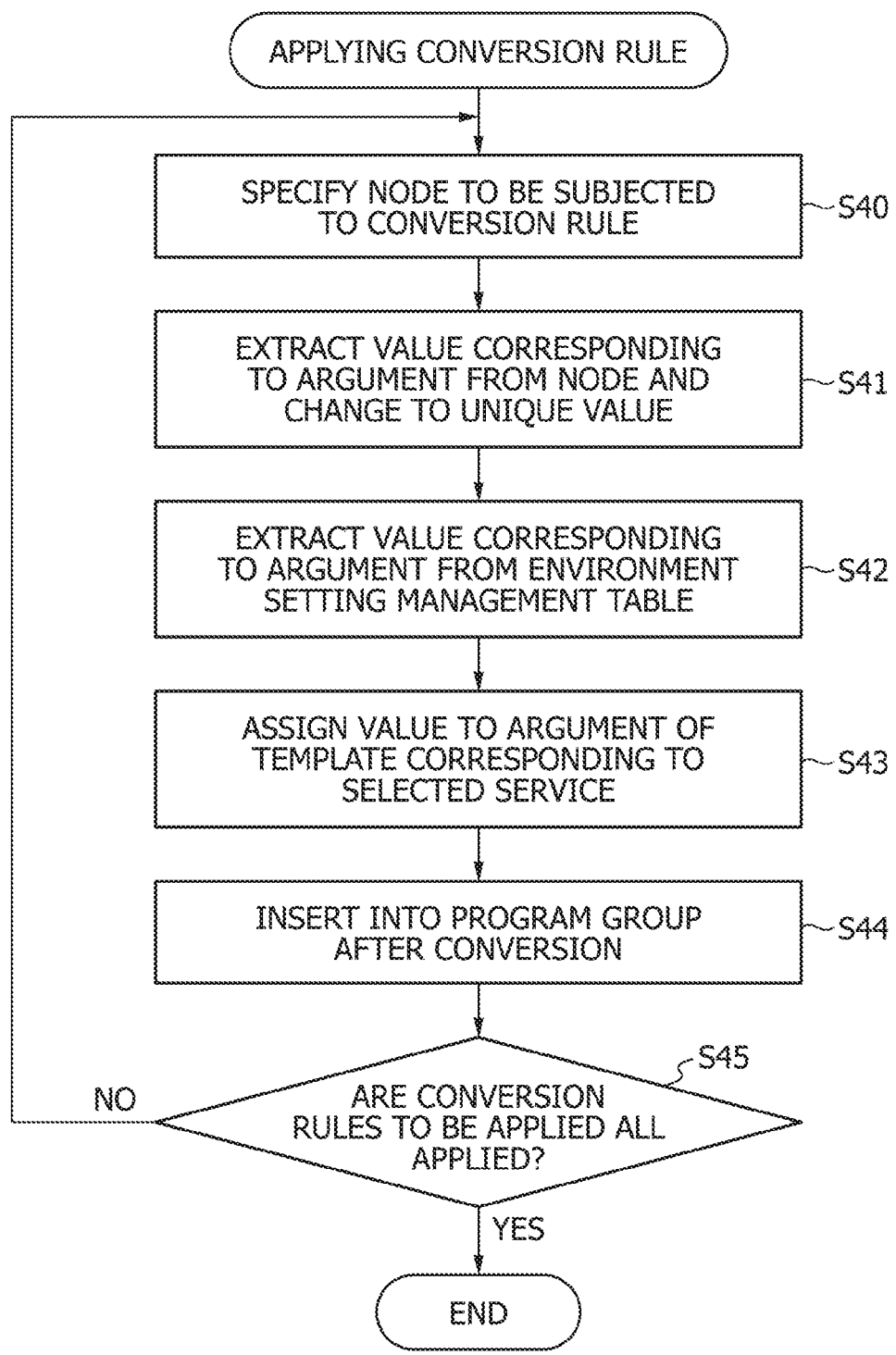
FIG. 22 is a flow chart illustrating an example of a procedure of applying the conversion rules.

FIG. 22 is a flow chart illustrating an example of a procedure of applying the conversion rules.

(S40) The code generation unit 135 specifies the node to be subjected to an unapplied conversion rule from the abstract syntax tree of the program before conversion. The unapplied conversion rule is selected from the conversion rules corresponding to the services confirmed on the output screen 40 of FIG. 21.

(S41) The code generation unit 135 specifies the argument of the template included in the conversion rule for the node specified in step S40. The code generation unit 135 extracts a value corresponding to the specified argument from the node of interest. Examples of the value to be extracted include the variable name and the function name used in the program before conversion. The code generation unit 135 also changes the extracted value to a value unique in the program after conversion.

(S42) The code generation unit 135 reads the authentication information corresponding to the used cloud system 20 from the environment setting management table 141. The code generation unit 135 extracts a value corresponding to the argument specified in step S41 from the read authentication information.

(S43) The code generation unit 135 assigns the values extracted in steps S41 and S42 to the argument of the template and generates a program after conversion. For example, the code generation unit 135 replaces a given character string indicating the argument with the values extracted in steps S41 and S42.

(S44) The code generation unit 135 inserts the program after conversion generated in step S43 into the program group after conversion. Note that a plurality of fragmentary programs for using a plurality of cloud services may be generated from one program before conversion.

(S45) The code generation unit 135 determines whether all the conversion rules to be applied are already applied. If all the conversion rules are already applied, the procedure of applying the conversion rules ends. If there is an unapplied conversion rule, the process proceeds to step S40.

Next, a procedure of starting the cloud service based on the program group after conversion will be described.

Figure 23A:
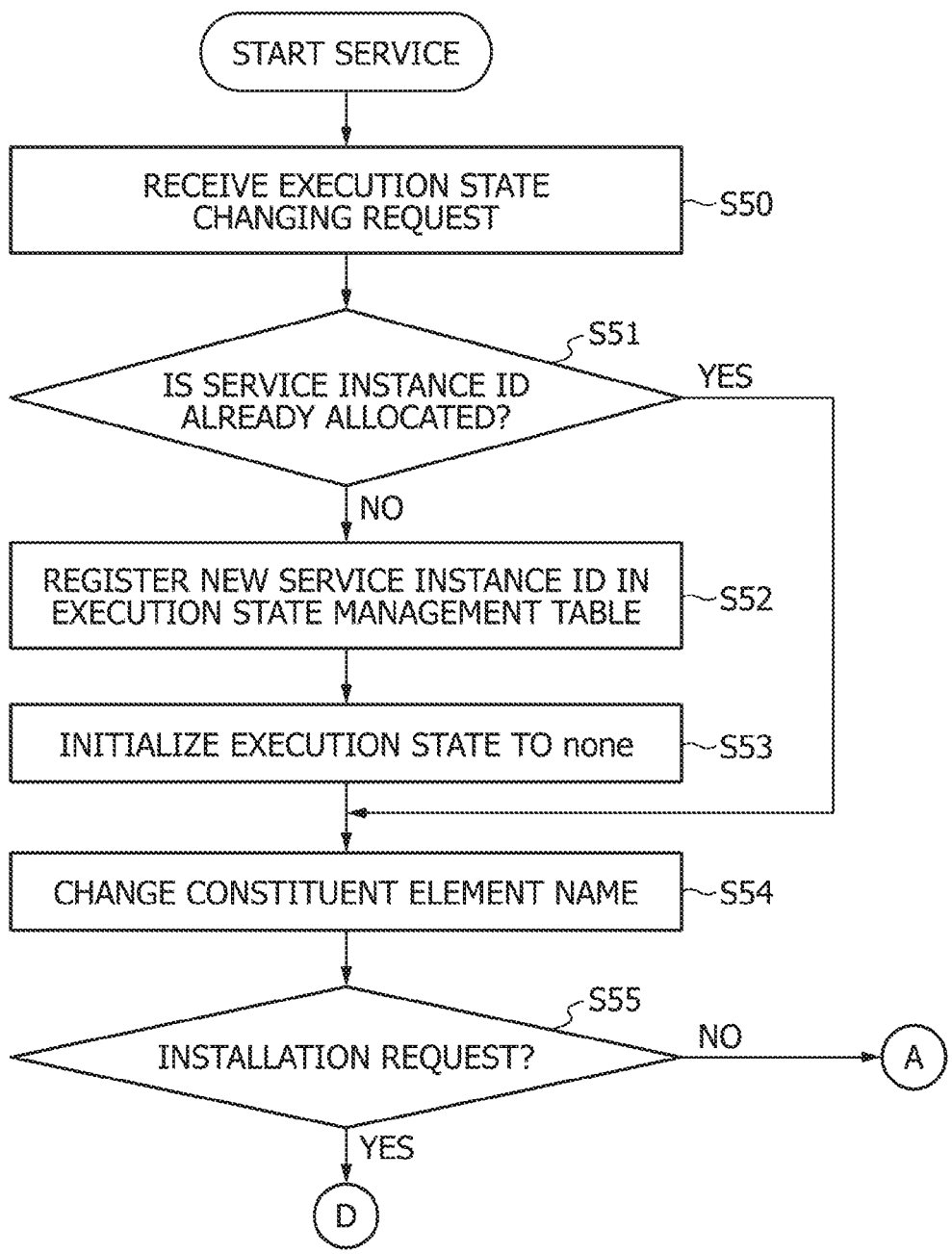
FIGS. 23A and 23B are a flow chart illustrating an example of a procedure of a start service.
Figure 23B:
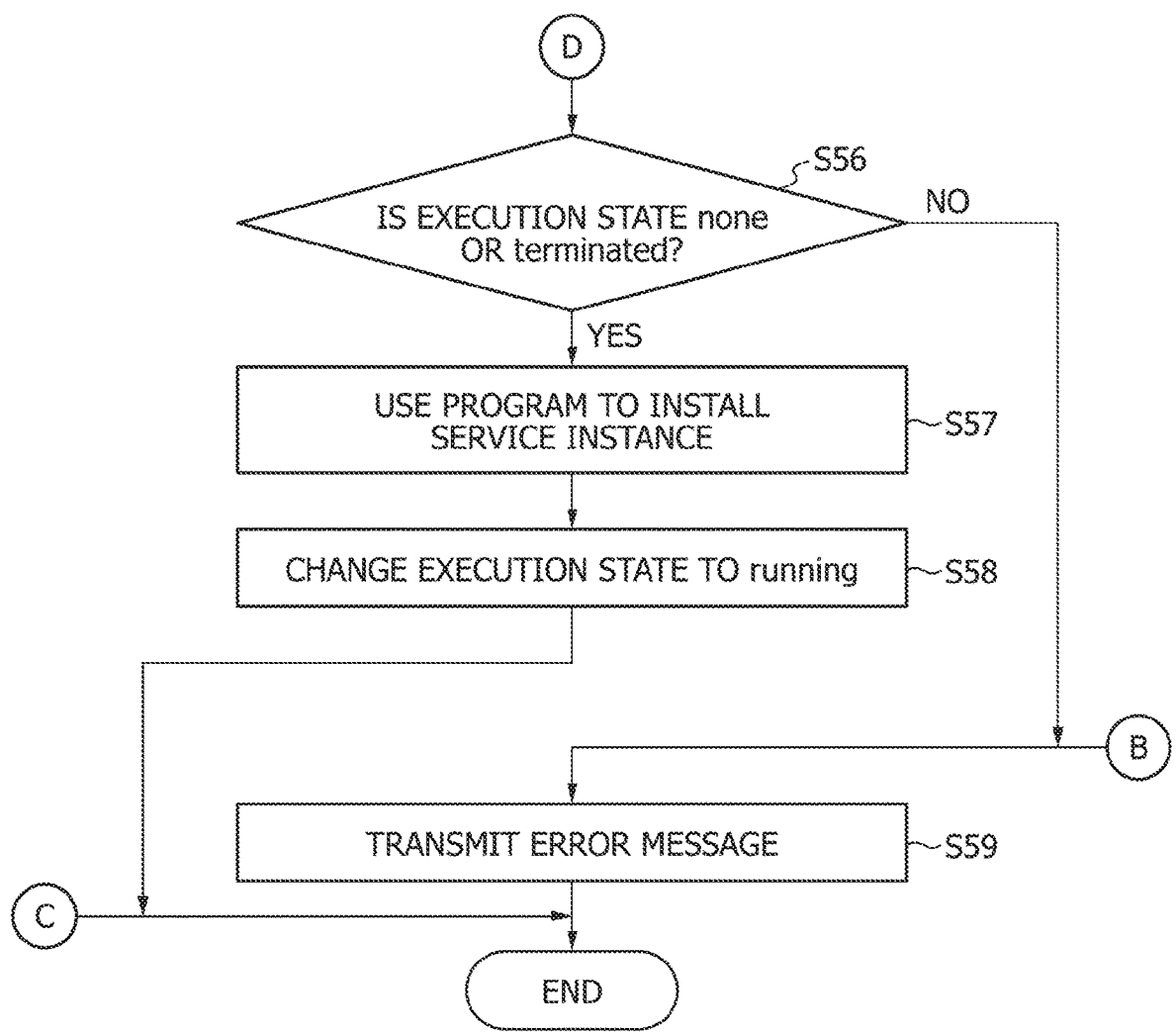

FIGS. 23A and 23B are a flow chart illustrating an example of a procedure of a start service.

(S50) The development UI unit 131 receives an execution state changing request. The execution state changing request is one of the installation request, the termination request, and the removal request.

(S51) The start control unit 133 determines whether the service instance ID is already allocated to the service instance designated by the execution state changing request. The service instance ID is not allocated to a new service instance that has not been installed. The execution state changing request may include the service instance ID when an existing service instance is installed again, terminated, or removed. The process proceeds to step S54 if the service instance ID is already allocated, and the process proceeds to step S52 if the service instance ID is not allocated.

(S52) The start control unit 133 generates a new service instance ID and registers the generated service instance ID in the execution state management table 148.

(S53) The start control unit 133 initializes the execution state corresponding to the service instance ID of step S52 to "none."

(S54) The start control unit 133 searches for the constituent element name, such as the function name and the container name of FaaS, from the program group after conversion corresponding to the service instance for which the execution state is to be changed. The start control unit 133 changes the constituent element name to a unique name to reduce conflict with other service instances. For example, a literal, such as the service instance ID, is added to the end of the function name or the container name described in the program group after conversion.

(S55) The start control unit 133 determines whether the received execution state changing request is an installation request. The process proceeds to step S56 if the execution state changing request is an installation request, and the process proceeds to step S60 in other cases.

(S56) The start control unit 133 determines whether execution state registered in the execution state management table 148 is "none" or "terminated." The process proceeds to step S57 if the execution state is "none" or "terminated." The process proceeds to step S59 if the execution state is another state, such as "running" and "removed."

(S57) The start control unit 133 uses the program group after conversion rewritten in step S54 to communicate with the PaaS system 21, the FaaS system 22, and the storage system 23 and installs the service instance on the cloud system 20. For example, the start control unit 133 may transmit the program after conversion to be executed by the PaaS system 21 or the FaaS system 22. The transmitted program after conversion may be immediately executed or may be executed when a given event occurs. The start control unit 133 may execute a procedure defined by the program after conversion to transmit setting information. For example, the start control unit 133 transmits setting information including the container name to the storage system 23.

(S58) The start control unit 133 changes the execution state registered in the execution state management table 148 to "running." The start service then ends.

(S59) The start control unit 133 generates an error message indicating that the execution state changing request is denied. The development UI unit 131 returns the error message.

Figure 24:
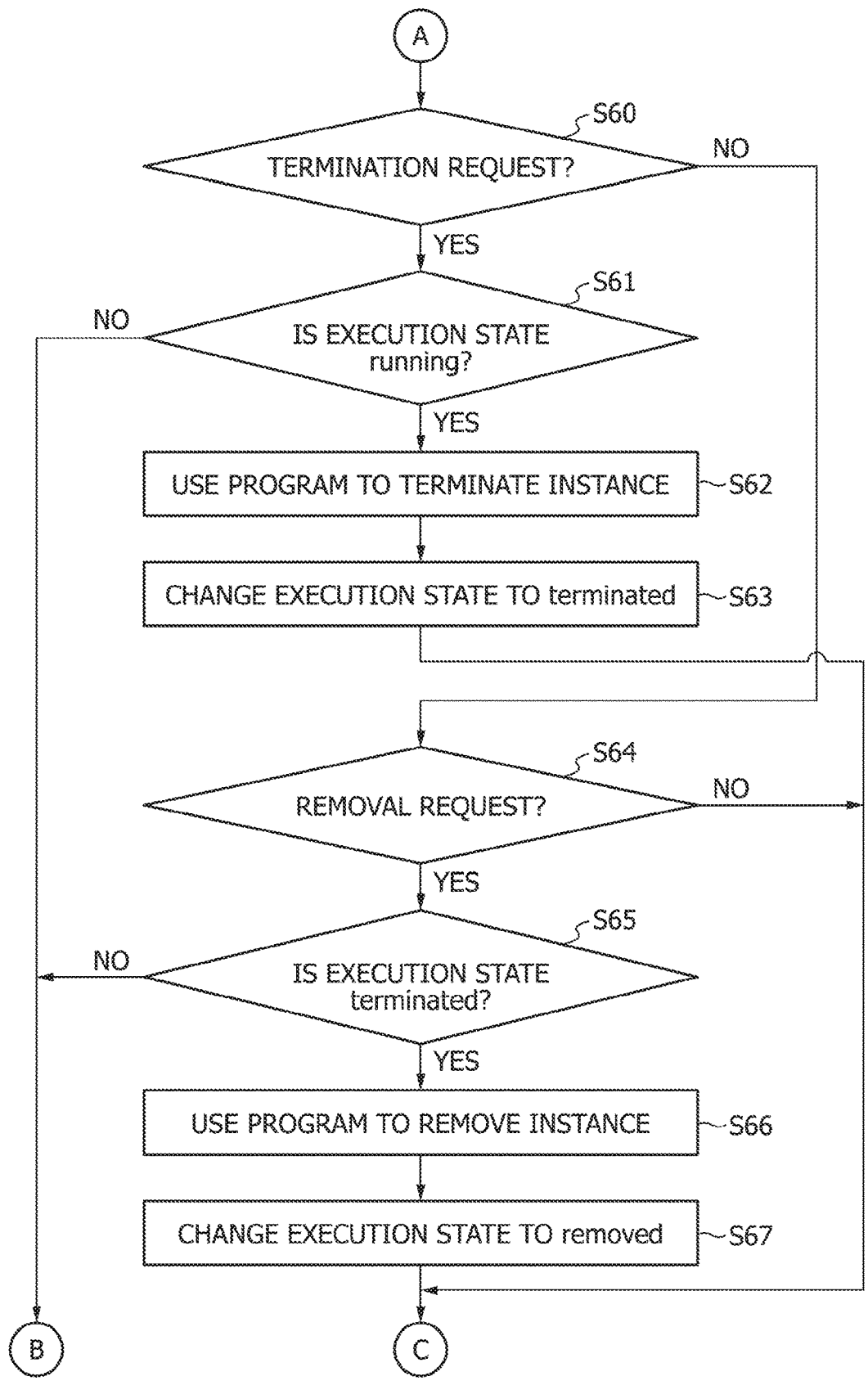
FIG. 24 is a flow chart (continued) of the example of the procedure of the start service.

FIG. 24 is a flow chart (continued) illustrating the example of the procedure of the start service.

(S60) The start control unit 133 determines whether the received execution state changing request is a termination request. The process proceeds to step S61 if the execution state changing request is a termination request, and the process proceeds to step S64 in other cases.

(S61) The start control unit 133 determines whether the execution state registered in the execution state management table 148 is "running." The process proceeds to step S62 if the execution state is "running." The process proceeds to step S59 if the execution state is another state, such as "none," "terminated," and "removed."

(S62) The start control unit 133 uses the program group after conversion rewritten in step S54 to communicate with the PaaS system 21, the FaaS system 22, and the storage system 23 and causes the cloud system 20 to terminate the service instance. The start control unit 133 may execute a procedure defined in the program after conversion to transmit the setting information. For example, the application of the PaaS system 21 and the function of the FaaS system 22 are deleted.

(S63) The start control unit 133 changes the execution state registered in the execution state management table 148 to "terminated." The start service then ends.

(S64) The start control unit 133 determines whether the received execution state changing request is a removal request. The process proceeds to step S65 if the execution state changing request is a removal request, and the start service ends in other cases.

(S65) The start control unit 133 determines whether the execution state registered in the execution state management table 148 is "terminated." The process proceeds to step S66 if the execution state is "terminated." The process proceeds to step S59 if the execution state is another state, such as "none," "running," and "removed."

(S66) The start control unit 133 uses the program group after conversion rewritten in step S54 to communicate with the PaaS system 21, the FaaS system 22, and the storage system 23 and causes the cloud system 20 to remove the service instance. For example, the container of the storage system 23 is deleted.

(S67) The start control unit 133 changes the execution state registered in the execution state management table 148 to "removed." The start service then ends.

In this way, the conversion rule table 145 includes the template indicating the format of a given program defining the process of the service. When a set of services is specified, the code generation unit 135 generates, based on the template for the service belonging to the specified set of services, the program after conversion (another program) defining execution of the process according to the code corresponding to the code pattern in the program. The start control unit 133 installs the services belonging to the specified set of services on each subsystem (information processing apparatus such as a server computer belonging to the subsystem) belonging to the cloud system 20 through the network based on the program after conversion (another program). As a result, each subsystem executes distributed processing software corresponding to the program before conversion based on the set of services specified by the development server 100.

According to the development server 100, the service to be used suitable for the constraint condition of the user may be appropriately specified.

As illustrated above, the upper limit of the sum of the costs associated with the use of services may be used as the constraint condition 143 to combine and provide the services to the user such that the cost does not exceed the cost expected by the user. However, the content of the constraint condition 143 is not limited to the upper limit of the sum of the costs.

For example, an upper limit or a lower limit regarding the performance value associated with the use of service may be set for the constraint condition 143 as a parameter alternative to the cost. As a result, the services may be combined and provided to the user to satisfy the performance expected by the user. For example, the upper limit of the total response time may be used as the constraint condition 143. The upper limit of the total response time may be lowered (or a set of services with a shorter total response time may be selected) to speed up the execution of the distributed processing software based on the program group after conversion.

In addition, for example, a lower limit of the average availability rate may be used as the constraint condition 143 to improve the reliability of the function realized by the distributed processing software. An example of the index related to the availability rate or the reliability of service includes a frequency of release of update patches by the vendor regarding the program of the service. The higher the frequency of release of update patches, the higher the frequency of termination of the service due to the update. Therefore, the availability rate is reduced.

Alternatively, a lower limit of the index indicating the visibility of the code of the program after conversion (the higher the value, the higher the visibility) may be set for the constraint condition 143 as a parameter alternative to the cost. For example, the lower limit of the sum of indices indicating the visibility of the code may be raised (or a set of services with a larger sum of indices may be selected) to improve the visibility of the program after conversion, and this may facilitate the maintenance of the program after conversion by the user.

Conditions for a plurality of types of parameters, such as cost and performance value, may be used as the constraint conditions 143. In this case, the service selection unit 134 selects a set of services satisfying all the conditions for the plurality of types of parameters. The service selection unit 134 may also receive an input of priorities for various parameters through the development UI unit 131. When there are a plurality of sets of services satisfying the constraint conditions 143, the service selection unit 134 may select a set with superior evaluation for the condition of the type of parameter with a higher priority. For example, it is assumed that the constraint conditions 143 include conditions for the cost and the performance value, and the priority of the cost is higher than the priority of the performance value. In this case, when there are a plurality of sets of services satisfying all the conditions for the cost and the performance value, the service selection unit 134 may specify that the set of services to be used is a set with the minimum cost among the plurality of sets.

In this way, the cost such as a billing amount for the user, the performance value such as response time, the index indicating the visibility of the code of the program after conversion, and various other parameters may be used for the constraint condition. The service selection unit 134 may refer to the information indicating the candidates for services regarding the code pattern and the values of the parameters corresponding to the candidates for services to specify the set of services in which the set of values of parameters satisfy the constraint condition. This allows the user to use the parameter according to the policy that the user puts more weight on, and the service compatible with the policy of the user may be appropriately provided.

According to the information processing system of the second embodiment, if the developer creates a program such that the entire core logic is closed and executed on one computer, a program group for associating and using a plurality of cloud services may be generated from the program. Therefore, the developer does not have to learn the API and the terms uniquely defined by the cloud provider, and the learning cost may be reduced. In addition, the developer does not have to directly describe fragmentary programs or setting information distributed to a plurality of cloud services, and the developer may focus on defining the core logic. This improves the development efficiency of the application software for using the plurality of cloud services. Instead of the developer, the development server 100 transmits the programs and the setting information to the plurality of cloud services altogether. Therefore, the developer does not have to individually access the cloud services, and the efficiency of installation of service instances may be improved.

Note that the information processing system of the second embodiment may be realized by a large-scale computer (or computer system) including a plurality of calculation nodes (for example, server blades and information processing units). In this case, a first calculation node may execute the function of the development server 100, and a plurality of second calculation nodes may execute the functions of the plurality of subsystems.

For example, when the first calculation node belonging to the computer acquires the constraint condition and the program and executes the acquired program, the first calculation node may specify the set of services satisfying the constraint condition from a plurality of candidates for services based on the code pattern included in the program. The first calculation node may generate the program after conversion according to the set of services specified from the acquired program. The plurality of second calculation nodes belonging to the computer may execute the program (or program after conversion) based on the specified set of services.

Third Embodiment

Hereinafter, a third embodiment will be described. Matters different from the second embodiment will be mainly described, and the description of common matters will not be repeated.

The device configuration of the information processing system of the third embodiment is similar to the device configuration of the information processing system of the second embodiment illustrated in FIG. 2. Therefore, the same reference signs and names as in the second embodiment will be used to describe the components in the third embodiment.

The cost function for the constraint condition may vary depending on the relationship between services to be used. For example, a case of using the availability as the constraint condition will be considered. An example of the index indicating the availability includes an availability rate. The constraint condition regarding the performance, such as the availability rate, is also expressed by the cost function. The cost function expressing the availability rate may vary depending on the relationship between services to be used.

Figures 25A, 25B:
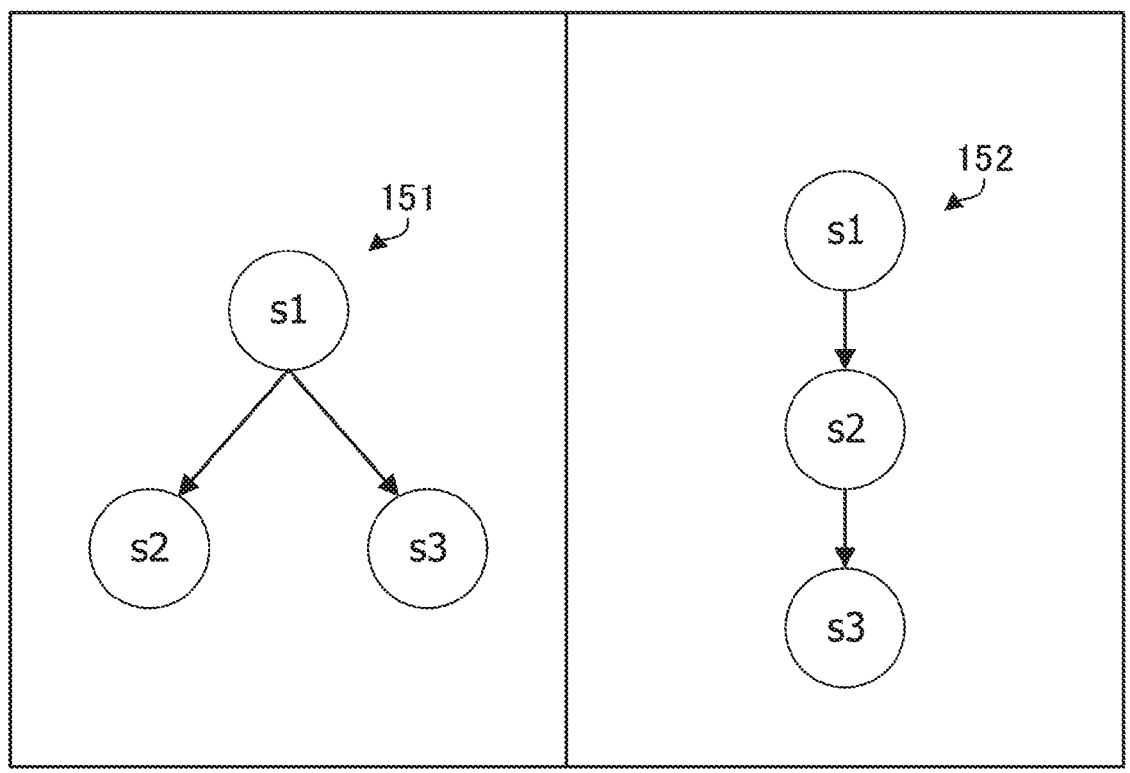
FIGS. 25A and 25B depict an example of a relationship between services.

FIGS. 25A and 25B depict an example of the relationship between services. FIGS. 25A and 25B illustrate two candidates for relationship between services s1, s2, and s3 according to the method of linking the services s1, s2, and s3. The relationship (coupling relationship) between services is illustrated by a graph, in which the nodes represent services, and the edges represent calls from services to other services.

FIG. 25A illustrates a graph 151. The graph 151 illustrates a relationship in which the service s1 calls one of the services s2 and s3. For example, when the services s2 and s3 can execute service processing of each other, the user may use an application realized by the link of the services s1, s2, and s3 if the service s1 is available and one of the services s2 and s3 is available.

FIG. 25B illustrates a graph 152. The graph 152 illustrates a relationship in which the service s1 calls the service s2, and the service s2 calls the service s3. In this case, the user may not use an application realized by the link of the services s1, s2, and s3 unless all the services s1, s2, and s3 are available.

For example, it is assumed that a ratio of mean time between failures (MTBF) to the sum of the mean time between failures and mean time to recovery (MTTR) (MTBF/(MTBF+MTTR)) is used as the availability rate. In this case, the cost function representing the availability rate in the service configuration corresponding to the graph 151 and the cost function representing the availability rate in the service configuration corresponding to the graph 152 are different. In this way, the cost function may vary depending on the relationship between services. The relationship between services is determined according to the description of the program 142 by the user. Therefore, the development server 100 in the third embodiment uses an appropriate cost function according to the relationship between services to provide a function for assisting the selection of services to be used.

Figure 26:
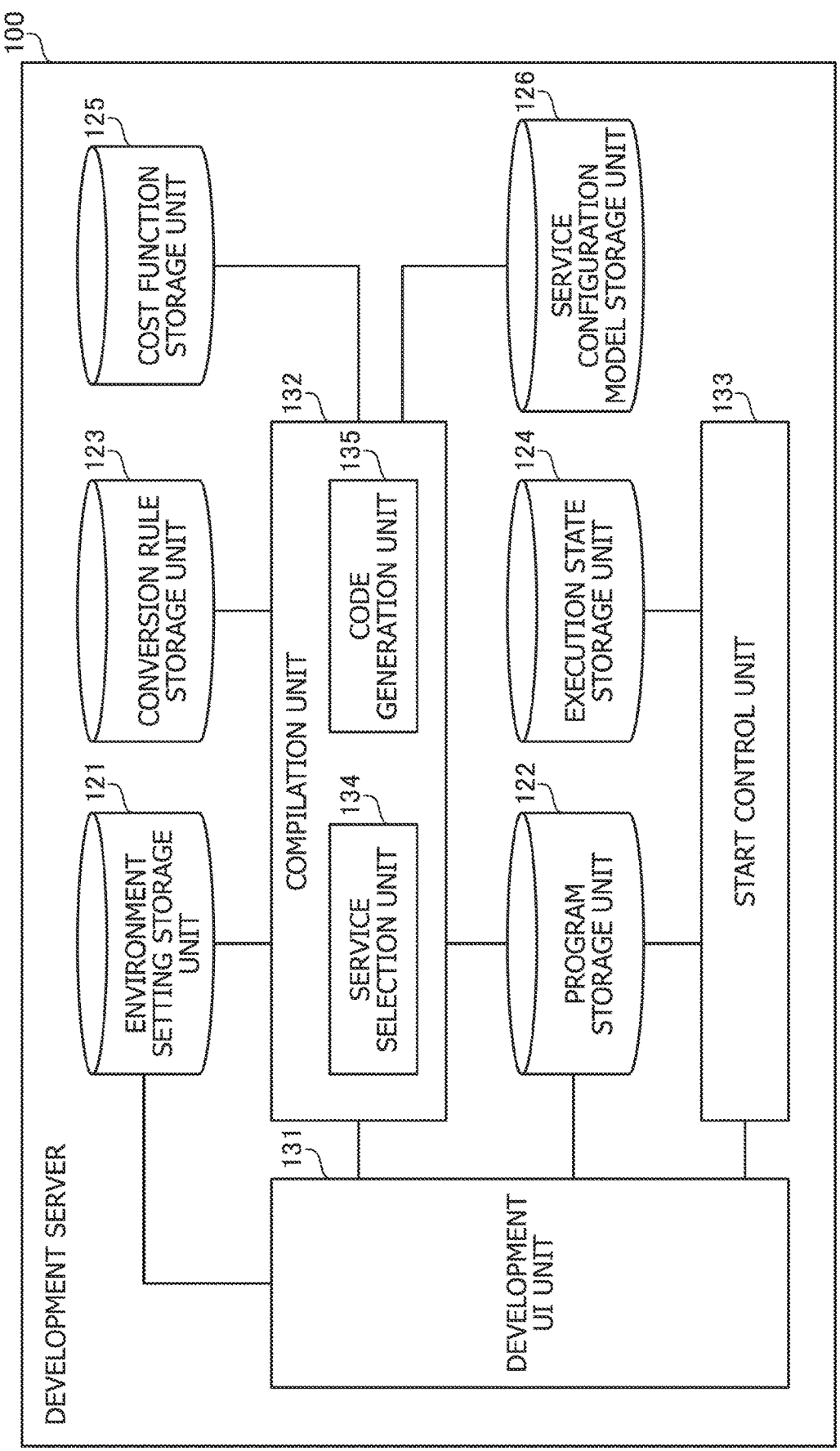
FIG. 26 is a block diagram illustrating an example of functions of the development server according to a third embodiment.

FIG. 26 is a block diagram illustrating an example of functions of the development server according to the third embodiment. The development server 100 further includes a cost function storage unit 125 and a service configuration model storage unit 126 in addition to the functions illustrated in FIG. 4. The cost function storage unit 125 and the service configuration model storage unit 126 are implemented by using, for example, the storage area reserved in the RAM 102 or the HDD 103.

For each pattern, the cost function storage unit 125 stores in advance the cost function corresponding to the pattern of the service configuration. For each user, the service configuration model storage unit 126 stores the service configuration specified by the following process executed by the service selection unit 134. For example, the user may use the web browser of the client 11 to access the development server 100 to check the service configuration corresponding to existing application software.

In addition to the functions of the second embodiment, the service selection unit 134 specifies the service configuration corresponding to the program input by the user and selects the cost function according to the service configuration. The service selection unit 134 uses the depth-first search to analyze the abstract syntax tree of the program input by the user to generate a graph representing the service configuration. The service selection unit 134 compares the service configuration represented by the generated graph and the pattern of the service configuration stored in the cost function storage unit 125 and acquires the cost function corresponding to the generated graph from the cost function storage unit 125. The service selection unit 134 uses the acquired cost function to select the service to be used.

FIG. 27 depicts an example of the program before conversion and the constraint condition. The program 142 is stored in the program storage unit 122. The program 142 is the same as the program before conversion illustrated in FIG. 6.

A constraint condition 143a is stored in the program storage unit 122. The constraint condition 143a is information received from the client 11. In FIG. 27, the constraint condition 143a includes a parameter "Availability." The "Availability" is a lower limit of the availability rate permitted when the cloud service is used to execute the program 142. The lower limit of the availability rate is set to "99%" in FIG. 27.

When the availability rate is used as the constraint condition 143a, the availability of each service to be used is registered in advance in the item of the cost in the conversion rule table 145 stored in the conversion rule storage unit 123.

Figure 28:
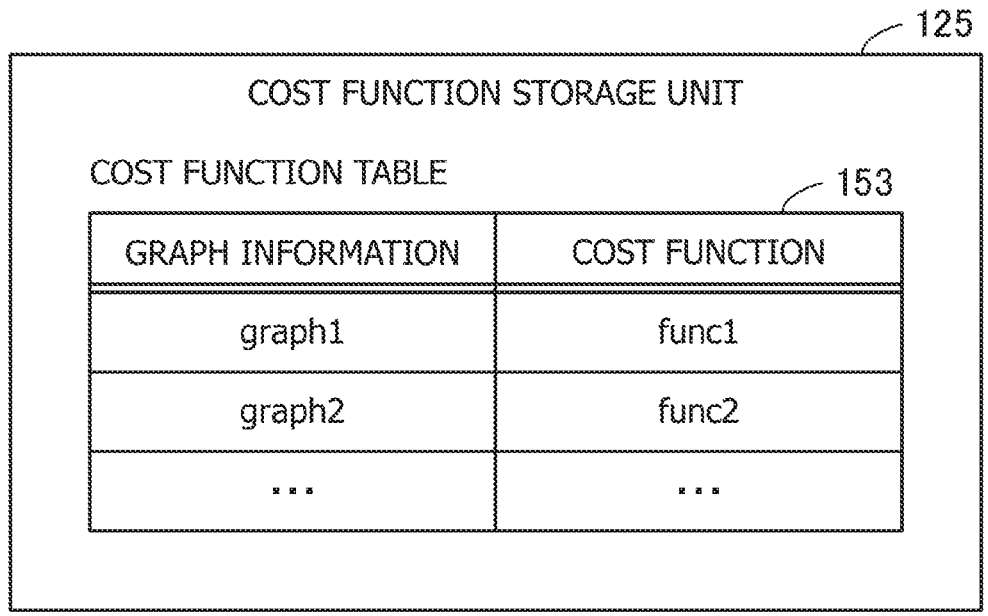
FIG. 28 depicts an example of a cost function table.

FIG. 28 depicts an example of a cost function table. A cost function table 153 is stored in the cost function storage unit 125. The cost function table 153 includes items of graph information and cost function. Graph data indicating prepared patterns of service configuration is registered in the item of graph information. Cost functions corresponding to the patterns of service configuration are registered in the item of cost function. For example, a cost function "func1" is registered for graph information "graph1" in the cost function table 153.

The service selection unit 134 may use the cost function "func1" to select the service when the graph generated for the program described by the user is compatible with the graph information "graph1." For example, the service selection unit 134 may use the cost function "func1" to select the service when the coupling relationship between service candidates indicated by the generated graph is compatible with the coupling relationship between services indicated by the graph information "graph1." A plurality of pieces of graph data corresponding to a plurality of patterns of service configuration (coupling relationship between services) are registered in advance in the cost function table 153.

Figure 29:
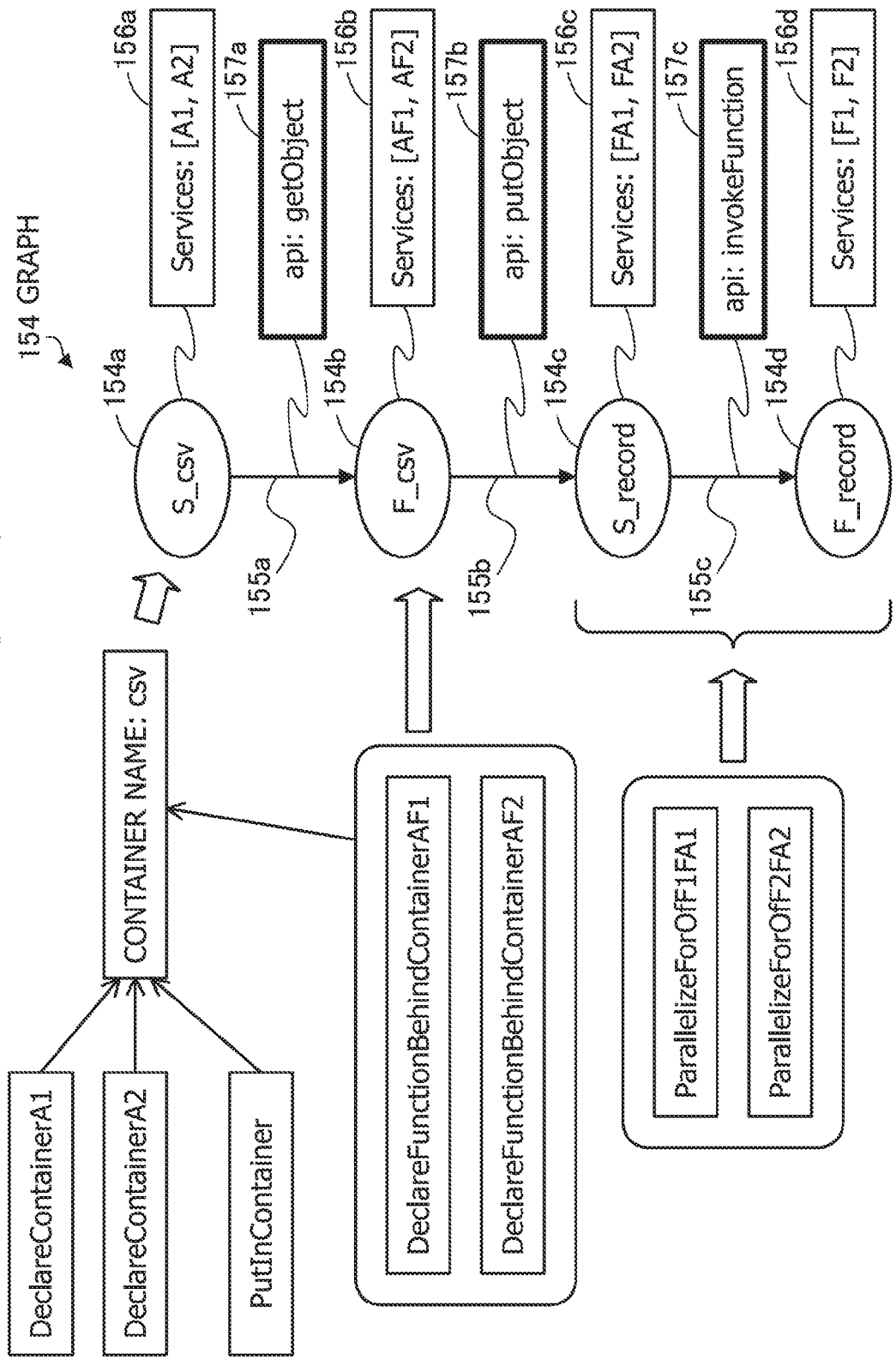
FIG. 29 depicts an example of a service configuration model.

FIG. 29 depicts an example of a service configuration model. A graph 154 is a graph illustrating a service configuration model corresponding to the program 142. The graph 154 includes nodes 154a, 154b, 154c, and 154d and edges 155a, 155b, and 155c.

The node 154a is a node created for the container services A1 and A2 of the rule IDs "R2" and "R3" in the conversion rule table 145. The rule IDs "R2" and "R3" are applied to a node that creates a container with container name "csv" in the abstract syntax tree 144. Therefore, the service selection unit 134 sets the node name of the node 154a to "S_csv." A prefix "S_" indicates that the node corresponds to creation of container. As described later, the service selection unit 134 may set the service instance name as the node name.

The service selection unit 134 sets, in the node 154a, identification information 156a ("Services: [A1, A2]") of the container services A1 and A2 as selection candidates corresponding to the node 154.

The edge 155a is an edge starting from the node 154a. The service selection unit 134 refers to the templates corresponding to the rule IDs "R2" and "R3" in the conversion rule table 145 to specify the API prepared for the services as selection candidates (container services A1 and A2). For example, the service selection unit 134 specifies an API "getObject" regarding the 154a from the templates and adds the API "getObject" as the edge 155a starting from the node 154a. The service selection unit 134 sets API information 157a ("api: getObject") in the edge 155a.

The node of the abstract syntax tree 144 provided with the rule name "PutInContainer" also provides an operation for the container with container name "csv." However, the operation is just a PUT operation for the container with container name "csv," and the service selection unit 134 does not add a new node to the graph 154.

The node 154b is a node created for the services AF1 and AF2 of serverless function with rule IDs "R5" and "R6" in the conversion rule table 145. The rule IDs "R5" and "R6" are applied to a node that uses a value assigned to the container with container name "csv" in the abstract syntax tree 144. Therefore, the service selection unit 134 sets the node name of the node 154b to "F_csv." A prefix "F_" indicates that the node corresponds to processing of the value assigned to the container. The service selection unit 134 sets, in the node 154b, identification information 156b ("Services: [AF1, AF2]") of the services AF1 and AF2 of serverless function as selection candidates corresponding to the node 154b.

The service selection unit 134 also specifies the container name "csv" of the container as a prerequisite for applying the rule IDs "R5" and "R6" from the abstract syntax tree 144 or the program 142. Therefore, the service selection unit 134 couples the node 154b to the end point of the edge 155a.

The edge 155b is an edge starting from the node 154b. The service selection unit 134 refers to the templates corresponding to the rule IDs "R5" and "R6" in the conversion rule table 145 to specify the API prepared for the services as selection candidates (services AF1 and AF2 of serverless function). For example, the service selection unit 134 specifies an API "putObject" from the templates with respect to the node 154b and adds the API "putObject" as the edge 155b starting from the node 154b. The service selection unit 134 sets API information 157b ("api: putObject") in the edge 155b.

The node 154c is a node created for the container services FA1 and FA2 with rule IDs "R7" and "R8" in the conversion rule table 145. The rules regarding the container services FA1 and FA2 with rule IDs "R7" and "R8" are applied to a node that creates a container with container name "record" in the abstract syntax tree 144. Therefore, the service selection unit 134 sets the node name of the node 154c to "S_record." The service selection unit 134 sets, in the node 154c, identification information 156c ("Services: [FA1, FA2]") of the container services FA1 and FA2 as selection candidates corresponding to the node 154c.

The service selection unit 134 also specifies that the node that creates the container with container name "record" in the abstract syntax tree 144 is in the scope of the process corresponding to the node 154b in the earlier stage. Therefore, the service selection unit 134 couples the node 154c to the end point of the edge 155b starting from the node 154b. The service selection unit 134 may specify that the process of creating the container with container name "record" is in the scope of the process corresponding to the node 154b in the earlier stage based on the description of the program 142. Note that the service selection unit 134 may similarly specify that the node 154d described later is in the scope of the process corresponding to the node 154b.

The edge 155c is an edge starting from the node 154c. The service selection unit 134 refers to the templates corresponding to the rule IDs "R7" and "R8" in the conversion rule table 145 to specify the API prepared for the services (container services FA1 and FA2) as selection candidates. For example, the service selection unit 134 specifies an API "invokeFunction" from the templates with respect to the node 154c and adds the API "invokeFunction" as the edge 155c starting from the node 154c. The service selection unit 134 sets API information 157c ("api: invokeFunction") in the edge 155c.

The node 154d is a node created for the services F1 and F2 of serverless function with rule IDs "R7" and "R8" in the conversion rule table 145. The rules regarding the services F1 and F2 of serverless function with rule IDs "R7" and "R8" are applied to a node that calls the function from the process of creating the container with container name "record" in the abstract syntax tree 144. Therefore, the service selection unit 134 sets the node name of the node 154d to "F_record." The service selection unit 134 sets, in the node 154d, identification information 156d ("Services: [F1, F2]") of the services F1 and F2 of serverless function selection candidates corresponding to the node 154d. The services F1 and F2 of serverless function do not call other services, and the service selection unit 134 does not create an edge starting from the node 154d.

Note that the node names of the graph 154 illustrated above are examples, and any names may be used as long as the nodes can be distinguished from each other. For example, the service selection unit 134 may extract the resource name (service instance name) from a code piece obtained by applying a conversion rule in the abstract syntax tree 144 to the node that is the target of the conversion rule and may set the resource name as the node name of the graph 154. In this case, for example, the service selection unit 134 extracts the service instance name illustrated in the configuration of service instances in FIG. 15 from the code piece after the application of the rule and sets the service instance name as the node name of the graph. For example, the service selection unit 134 may decide that the node name of the node 154a is "csv," the node name of the node 154b is "splitCsv," the node name of the node 154c is "record," and the node name of the node 154d is "sendEmail" in the program 142. The service selection unit 134 then provides edges indicating couplings between the service instances.

In this way, the service selection unit 134 generates the graph 154 representing the service structure model for the program 142.

Next, a processing procedure of the development server 100 of the third embodiment will be described.

Figure 30A:
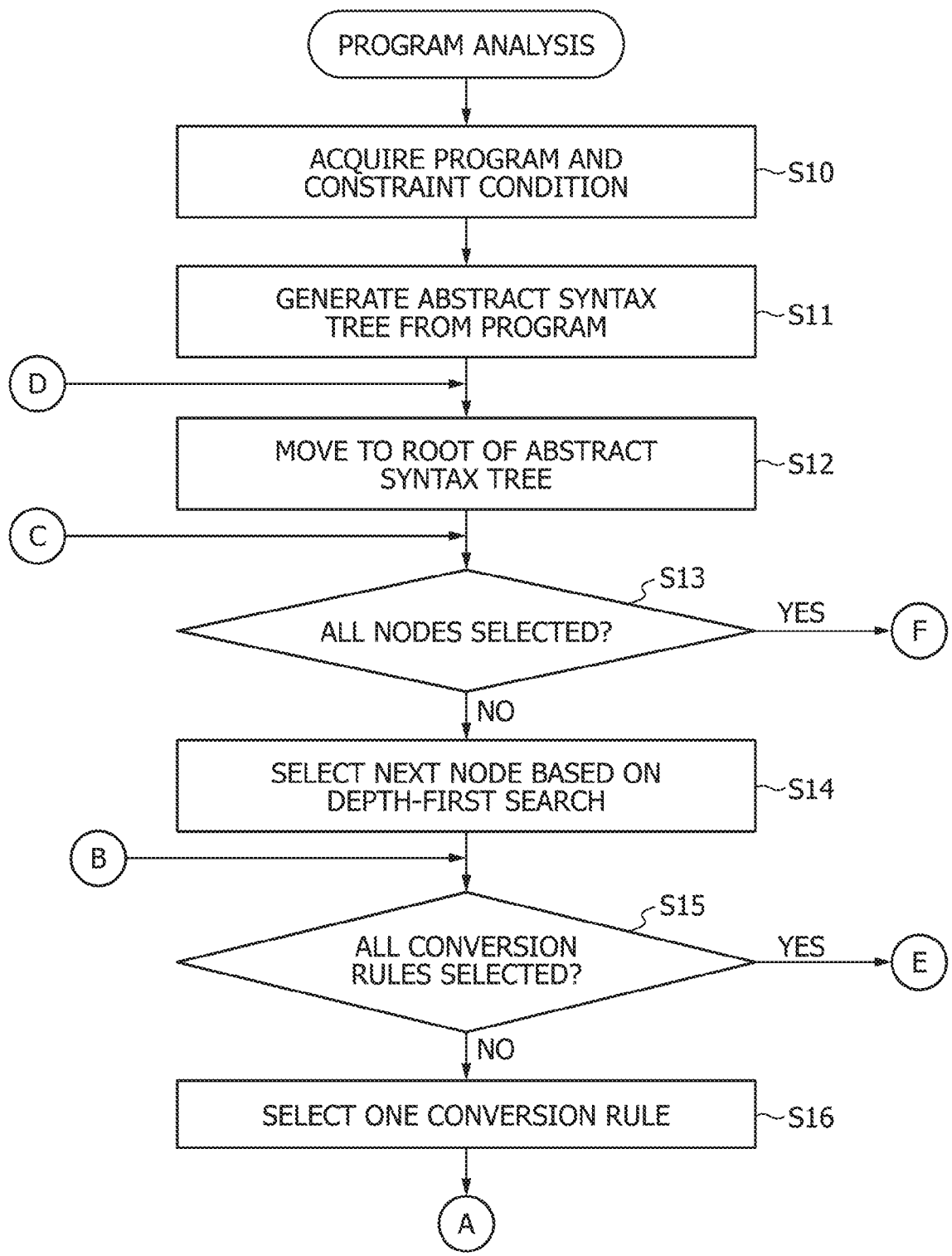
FIGS. 30A and 30B are a flow chart illustrating an example of a procedure of program analysis.
Figure 30B:
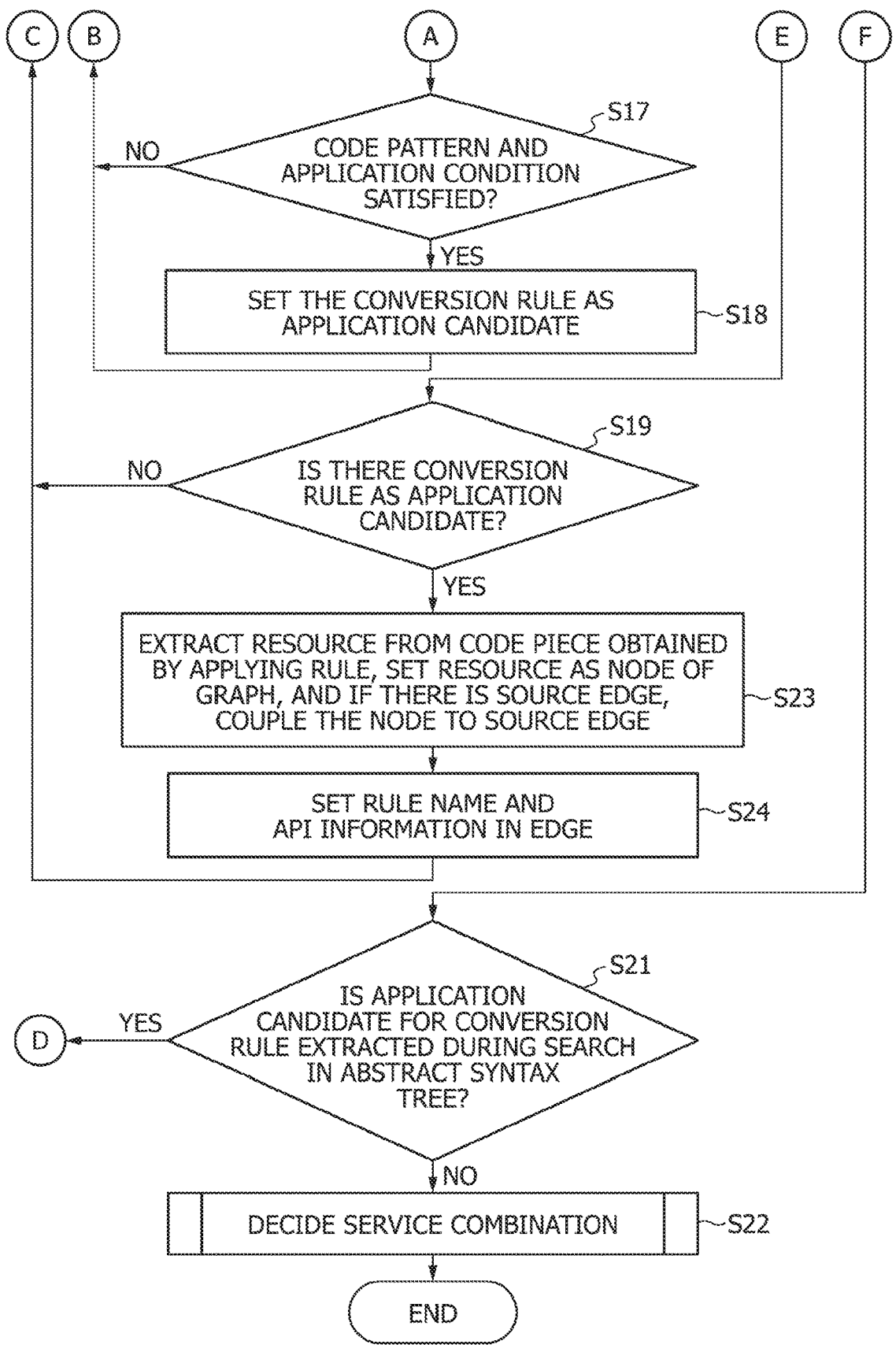

FIGS. 30A and 30B are a flow chart illustrating an example of a procedure of program analysis. The procedure of the third embodiment is different in that the procedure includes steps S23 and S24 in place of step S20 of the procedure in the second embodiment illustrated in FIG. 16B. Step S23 is executed if step S19 is Yes. Steps S23 and S24 are a process in which the service selection unit 134 creates a graph indicating the service configuration model from the program input by the user. A process according to the result of steps S23 and S24 (graph indicating service configuration model) is executed in step S22. Therefore, steps S23 and S24 will be mainly described, and the description of steps S10 to S22 will not be repeated.

(S23) The service selection unit 134 extracts a resource from a code piece obtained by applying the conversion rule to the node in the abstract syntax tree 144 and sets the resource as a node of the graph. The "node in the abstract syntax tree 144" indicates the node of the abstract syntax tree 144 selected in step S14. For example, the service selection unit 134 extracts, as a resource, the service instance name to be created and sets the resource as the node name of the node of the graph. If there is a source edge, the service selection unit 134 couples the node of the graph to the source edge. The "source edge" is an edge starting from the node corresponding to the service as a caller of the service corresponding to the node added to the graph this time. Note that the service selection unit 134 may not add a new node for a simple PUT operation for a resource indicated by an existing node as in the process provided with the rule name "PutInContainer" and may advance the process to step S13.

(S24) The service selection unit 134 refers to the template of the conversion rule corresponding to the node added in step S23 to add an edge to the node. The service selection unit 134 sets in the added edge the information of the call probability between service instances, the used rule name, and the API in the cloud service. Note that the service selection unit 134 may skip step S24 when the edge is not added to the node added in step S23. The process then proceeds to step S13.

In step S24, the service selection unit 134 may specify the call probability of the next service instance based on the template of the conversion rule corresponding to the node added in step S23.

The call probability is, for example, a use ratio of each API when there are a plurality of APIs for calling the next service. For example, the call probability is calculated according to which root of all the provided APIs is to be used. Alternatively, the information of the use ratio of each API used by the service instance may be stored in advance in the conversion rule storage unit 123. In this case, the service selection unit 134 may refer to the conversion rule storage unit 123 to specify the use ratio of the API (for example, call probability of calling the next service by using the API) corresponding to an edge starting from a node in the graph. For example, other than the method of specifying the use ratio based on the code of the template, records of past use ratios of each API used by the service instance may be stored in the conversion rule storage unit 123, and the use ratio may be used.

Based on the procedure of FIGS. 30A and 30B, the service selection unit 134 generates, for example, the graph 154 indicating the service configuration model for the program 142. The service selection unit 134 stores, for example, the information of the graph 154 created for the program 142 in the service configuration model storage unit 126. In step S22, the service selection unit 134 acquires the cost function based on the graph 154 and selects the service.

Figure 31:
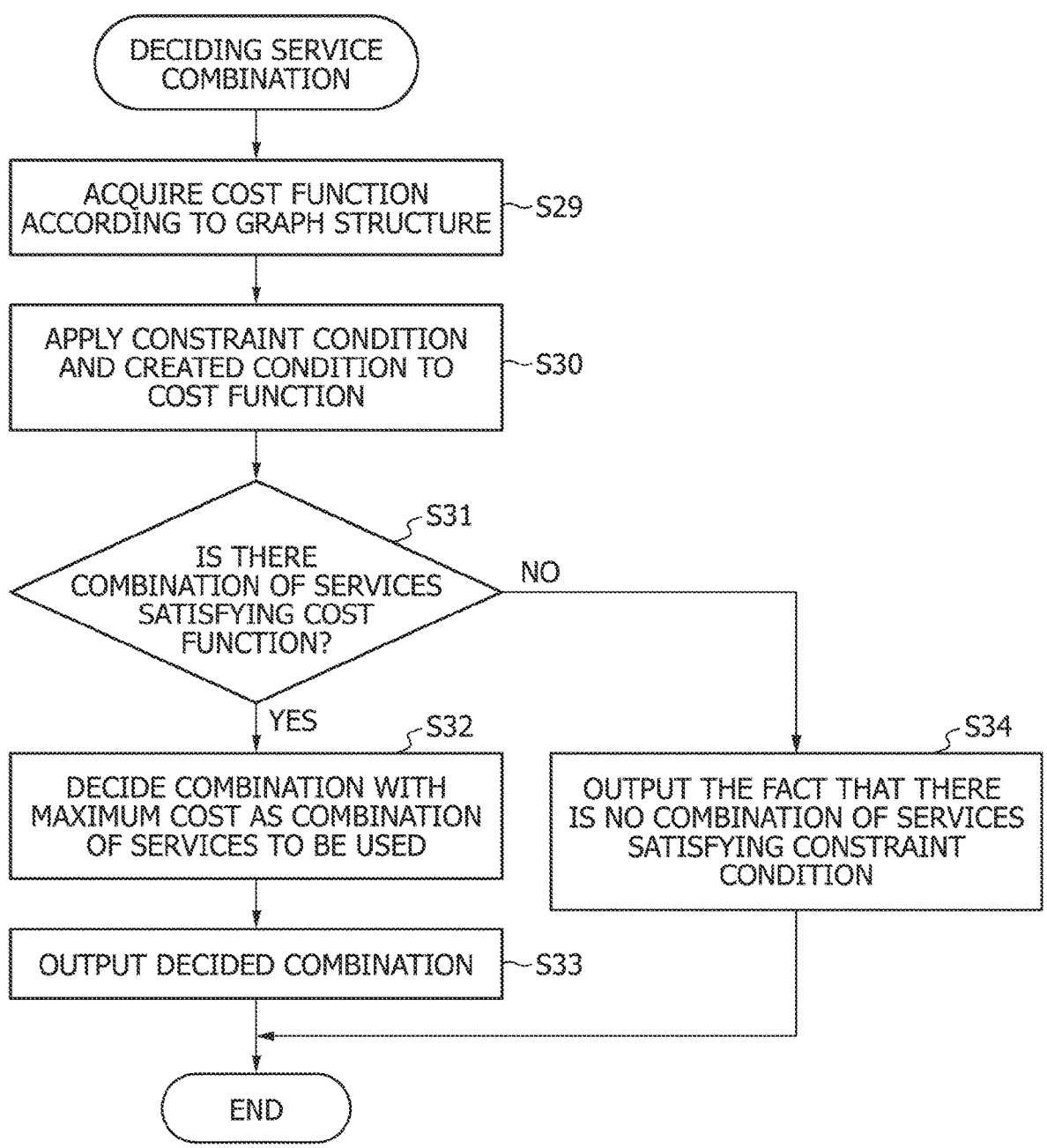
FIG. 31 is a flow chart illustrating an example of a procedure of deciding a service combination.

FIG. 31 is a flow chart illustrating an example of a procedure of deciding the service combination. The third embodiment is different in that the third embodiment includes step S29 before step S30 of the procedure of the second embodiment illustrated in FIG. 17. Therefore, step S29 will be described, and the description of steps S30 to S34 will not be repeated.

(S29) The service selection unit 134 refers to the cost function table 153 stored in the cost function storage unit 125 to select the cost function corresponding to the service structure model illustrated in the graph created in the procedure of FIGS. 30A and 30B. For example, the service selection unit 134 compares the graph created in the procedure of FIGS. 30A and 30B and the graph information stored in the cost function table 153 to specify the graph information that best matches the tree structure of the created graph. The service selection unit 134 acquires the cost function associated with the specified graph information from the cost function table 153. The process then proceeds to step S30.

The service selection unit 134 uses the cost function selected in step S29 to execute the procedure from step S30. In this way, the service selection unit 134 specifies the coupling relationship between candidates for services based on the code pattern of the program input by the user and decides the cost function according to the coupling relationship.

Note that it is assumed that the cost is the availability rate in the example of FIG. 31. Therefore, it is to be noted that the combination of maximum costs (for example, maximum availability rates) is decided as the combination of services to be used in step S32. However, when another parameter is used as the cost, the combination of minimum costs may be decided as the combination of services to be used in step S32 as illustrated in the second embodiment.

The development UI unit 131 may transmit the information of the graph 154 (including the information provided to the nodes and the edges) to the client 11 according to a request of the web browser of the client 11 and provide the service configuration model for the program 142 to the user.

Next, an example of the cost function according to the service configuration model will be described.

FIGS. 32A to 32C depicts an example of the cost function according to the service configuration model. It is assumed that the cost is the availability rate. FIG. 32A illustrates an example of the conditions for the services. The conditions of FIG. 32A are the same as the conditions illustrated in FIG. 19B. The meaning of the variables A1, A2, AF1, AF2, FA1, FA2, F1, and F2 is the same as the meaning described in FIGS. 19A to 19C.

The availability rate of the "container service A1" will be referred to as "a1." The availability rate of the "container service A2" will be referred to as "a2." The availability rate of the "service AF1 of serverless function" will be referred to as "af1." The availability rate of the "service AF2 of serverless function" will be referred to as "af2." The availability rate of the "container service FA1" will be referred to as "fa1." The availability rate of the "container service FA2" will be referred to as "fa2." The availability rate of the "service F1 of serverless function" will be referred to as "f1." The availability rate of the "service F2 of serverless function" will be referred to as "f2."

FIG. 32B illustrates an example of cost function (part 1). A cost function 161 is a cost function corresponding to a service configuration model 158. The "container service A1 (or A2)", the "service AF1 (or AF2) of serverless function," the "container service FA1 (or FA2)," and the "service F1 (or F2) of serverless function" are coupled in series in the service configuration model 158.

In this case, the cost function 161 is (a1 or a2)*(fa1 or fa2)*(f1 or f2)*(af1 or af2)>=A. The "or" operation indicates that one of the availably rates described on the left and the right of "or" is selected.

FIG. 32C illustrates an example of cost function (part 2). A cost function 162 is a cost function corresponding to a service configuration model 159. In the service configuration model 159, the "service F1 (or F2) of serverless function" and the "service AF1 (or AF2) of serverless function" are coupled in parallel to the "container server A1 (or A2)." The "container service FA1 (or FA2)" is further coupled to the "service AF1 (or AF2) of serverless function."

The call probability from the "container server A1 (or A2)" to the "service F1 (or F2) of serverless function" is p1 (0<p1<1). The call probability from the "container service A1 (or A2)" to the "service AF1 (or AF2) of serverless function" is p2 (0<p2<1). Note that p1+p2=1.

In this case, the cost function 162 is R1*p1+(R2*(a1 or a2))*p2>=A. Here, R1=(a1 or a2)*(f1 or f2). In addition, R2=(af1 or af2)*(fa1 or fa2).

As described above, the cost function may vary depending on the service configuration model corresponding to the program input by the user. The service selection unit 134 specifies the service configuration model for implementing the function of the program as the cloud service from the program input by the user and selects the cost function according to the service configuration model.

For example, the service selection unit 134 acquires the call probability between candidates for services to specify the coupling relationship between candidates for services. The service selection unit 134 may decide the cost function based on the call probability included in the coupling relationship between candidates for services. For example, a parameter that allows to set the call probability is prepared for the cost function extracted by the service selection unit 134 from the cost function table 153 regarding the service configuration model 159. The service selection unit 134 assigns the call probability of the service candidate of this time to the parameter to decide the cost function to be used to select the service.

Note that the cost functions are examples, and other cost functions may be used for the service configuration models 158 and 159.

In this way, according to the development server 100 of the third embodiment, an appropriate cost function according to the service configuration model (coupling relationship between service candidates) may be used to select the service to be used by the user. As a result, an appropriate service satisfying the conditions, such as the cost and the performance desired by the user, may be selected.

The information processing of the first embodiment may be realized by causing the processing unit 1b to execute a program. The information processing of the second and third embodiments may be realized by causing the CPU 101 to execute a program. The program may be recorded in the computer-readable recording medium 113.

For example, the recording medium 113 recording the program may be distributed to circulate the program. The program may be stored in another computer, and the program may be distributed through a network. The computer may store (install) the program recorded in the recording medium 113 or the program received from another computer in a storage apparatus, such as the RAM 102 and the HDD 103, and may read the program from the storage apparatus to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented method for identifying cloud service resources within a cloud computing system including a plurality of cloud resource services to execute a program, the method comprising:
    acquiring a constraint condition and the program;
    analyzing the program to identify code patterns within the program;
    identifying a plurality of candidate cloud resources capable of executing a service corresponding to a portion of the program corresponding to at least one identified code pattern;
    selecting one of the plurality of candidate cloud resources for each of the at least one identified code pattern based on the constraint condition;
    converting the acquired program into a program group to be executed by a specified set of the plurality of cloud resources services; and
    installing the program group within the cloud computing system so that the program group is executed using the specified set of the plurality of cloud resource services, the specified set including the selected candidate cloud resource.

2. The method according to claim 1, wherein the acquired program includes entire core logic developed for execution on a single computer rather than execution using the plurality of cloud resources.

3. The method according to claim 1, wherein analyzing includes
    generating an abstract syntax tree indicating structure of the program before the converting using at least one of a lexical analysis, syntax analysis and pattern matching; and
    identifying code patterns with a depth-first search of the generated abstract tree based on rule information and parameters applied to each node of the generated abstract tree.

4. The method according to claim 3, wherein the rule information includes templates indicating formats of programs defining processing of the cloud resource services.

5. The method according to claim 1, wherein the constraint condition includes at least one of a condition based on cost, performance, visibility of code of the program after the converting, availability and response time.

6. The method according to claim 5, wherein the acquiring acquires a plurality of constraint conditions and the method further comprises:
    assigning a priority level to each constraint condition; and
    the selecting is based on the assigned priority levels.

7. The method according to claim 1, wherein the selecting is based on a cost function according to the constraint condition.

8. The method according to claim 7, wherein the cost function includes computation for the costs of the plurality of cloud resource services, and the method further comprises generating a conditional expression indicating a condition for selecting a first candidate and a second candidate among a plurality of identified candidates and the specified set of the plurality of cloud resource services being based on the computation using the conditional expression.

9. The method according to claim 3, wherein the rule information includes a plurality of first candidate cloud resources regarding a first code pattern and a plurality of second candidates cloud resources for a second code pattern, and the selecting selects one of the plurality of first candidate cloud resources regarding the first code pattern included in the program and selects one of the plurality of second candidate cloud resources regarding the second code pattern included in the program.

10. The method according to claim 7, wherein the cost function relates to billing amounts for a user associated with use of the plurality of cloud resource services, and the constraint condition is an upper limit of a sum of the billing amounts for the user.

11. The method according to claim 7, wherein the cost function is based on a coupling relationship between the plurality of cloud resource services.

12. The method according to claim 11, wherein the cost function is based on a call probability between the candidates for the services included in the coupling relationship.

13. The method according to claim 1, wherein the converting is based on conversions rules stored within the converting includes apply conversion rules to the acquired program to generate components of the program group.

14. A development server for converting a program into distributed processing software to be executed within cloud computing system including a plurality of cloud resource services, the development server comprising:

a memory configured to store a constraint condition and the program;

a processor coupled to the memory and configured to:

acquire a constraint condition and the program;

analyze the program to identify code patterns within the program;

identify a plurality of candidate cloud resources capable of executing a service corresponding to a portion of the program corresponding to at least one identified code pattern;

select one of the plurality of candidate cloud resources for each of the at least one identified code pattern based on the constraint condition;

convert the acquired program into a program group to be executed by a specified set of the plurality of cloud resources services; and install the program group within the cloud computing system so that the program group is executed using the specified set of the plurality of cloud resource services, the specified set including the selected candidate cloud resource.

15. A non-transitory, computer-readable recording medium having stored therein an information processing program for causing a computer to execute a process, the process comprising:

acquiring a constraint condition and the program;

analyzing the program to identify code patterns within the program;

identifying a plurality of candidate cloud resources capable of executing a service corresponding to a portion of the program corresponding to at least one identified code pattern;

selecting one of the plurality of candidate cloud resources for each of the at least one identified code pattern based on the constraint condition;

converting the acquired program into a program group to be executed by a specified set of the plurality of cloud resources services; and installing the program group within the cloud computing system so that the program group is executed using the specified set of the plurality of cloud resource services, the specified set including the selected candidate cloud resource.

* * * * *